United States Patent
Giannotta

(10) Patent No.: US 11,764,645 B2
(45) Date of Patent: Sep. 19, 2023

(54) ELECTRICAL POWER GENERATING APPARATUS

(71) Applicant: Eugene A. Giannotta, Naples, FL (US)

(72) Inventor: Eugene A. Giannotta, Naples, FL (US)

( * ) Notice: Subject to any disclaimer, the term of this patent is extended or adjusted under 35 U.S.C. 154(b) by 251 days.

(21) Appl. No.: 16/993,440

(22) Filed: Aug. 14, 2020

(65) Prior Publication Data
US 2022/0052582 A1    Feb. 17, 2022

(51) Int. Cl.
*H02K 7/18* (2006.01)
*E01C 11/26* (2006.01)
*E01F 11/00* (2006.01)
*H02J 15/00* (2006.01)
*H02K 7/02* (2006.01)
*H02K 7/075* (2006.01)
*E01C 9/00* (2006.01)

(52) U.S. Cl.
CPC ............ *H02K 7/1853* (2013.01); *E01C 9/00* (2013.01); *E01C 11/265* (2013.01); *E01F 11/00* (2013.01); *H02J 15/007* (2020.01); *H02K 7/025* (2013.01); *H02K 7/075* (2013.01)

(58) Field of Classification Search
CPC ...... H02K 7/1853; H02K 7/025; H02K 7/075; H02J 15/007; E01C 9/00; E01C 11/265; E01F 11/00
See application file for complete search history.

(56) References Cited

U.S. PATENT DOCUMENTS

| | | | | |
|---|---|---|---|---|
| 2014/0339833 | A1* | 11/2014 | Chiu | H02K 7/1853 74/25 |
| 2015/0084344 | A1* | 3/2015 | Turner | H02K 7/1853 290/1 D |
| 2015/0115615 | A1* | 4/2015 | Jang | H02K 7/06 290/1 C |

* cited by examiner

*Primary Examiner* — Viet P Nguyen
(74) *Attorney, Agent, or Firm* — Southern Plains IP Law PLLC; Sue C. Watson

(57) ABSTRACT

An electrical power generating apparatus for generating electrical power using a generator connected directly or indirectly to a flywheel is disclosed. The apparatus comprises platforms, protrusions, generators, flywheels and other components. The platforms are configured to be laid on a surface and easily allow an object, e.g., a vehicle to traverse over the platforms. Each protrusion is configured to move downward and upward through apertures located in a top portion of the platform. The protrusions interact with reset members. The protrusions move in a linear/angle downward/downward-upward motion when the object pushes/strikes/depresses the protrusions. Each protrusion is connected in an operative manner to a shaft via a gear, and/or to a lever which is connected in an operative manner to shaft, thereby rotating the shaft by converting linear motion to rotational motion. A generator, flywheel, and gearbox can be coupled to the shaft.

11 Claims, 15 Drawing Sheets

ELECTRICAL POWER GENERATING APPARATUS

BACKGROUND OF THE INVENTION

A. Technical Field

The invention being disclosed within generally relates to an electrical power generating apparatus. Specifically, this invention relates to an electrical power generating apparatus that produces electricity by harnessing the moving and/or stopped weight/force of object(s) such as, but not limited to, vehicles, people, and so forth, as they traverse across/along surfaces such as, road surfaces, highways, streets, and so on, in the course of their customary activity without slowing down the speed/velocity of said object(s) by anything more than negligible levels.

B. Description of Related Art

Throughout the world efforts are being made to reduce carbon emissions and reduce power consumption. Innovative solutions to reduce carbon emissions, reduce power consumption, and harness renewable energy resources, are the focus of many of today's scientific endeavors. In general, the movement of objects such as, but not limited to, vehicle tires affixed to vehicles, and/or people, as either traverse along surfaces, results in said objects exerting weight/force on said surfaces. However, such forces expended on said surfaces are rarely harnessed and used as a power source for useful applications.

Electric power is produced from both non-renewable and renewable energy sources such as oil, natural gas, coal, hydroelectric, wind, solar, geothermal, etc. Electricity generated from non-renewable energy sources is known to cause pollution and is also thought to contribute to climate change.

Much of the electricity generated from renewable energy sources has typically been more costly than electricity generated from non-renewable resources and unfortunately has had its own unintended environmental consequences. For example, wind turbines are known to kill large numbers of birds every year, and ground based solar power systems consume large swaths of land and are manufactured with hazardous materials.

A prior art, WO2019046816 assigned to Bish Daniel, discloses an energy harvesting system fashioned into speed bumps and/or affixed inside roadways that includes base plate with an external surface that supports the multiple actuators that is used to actuate the generator through the racks and pinion that is contained within the housing, wherein the actuator is protruding out of the housing top. The system further includes generator, spring and disc. The actuator is depressed by the weight of the passing vehicle and then engages with the spring that is compressed and then it engages the rack and pinion to activate the generator with a flywheel that is a mechanical storage device. The device includes one-way bearing can be coupled to the main shaft such that rotation of the main shaft can result in rotation of the one-way bearing and the bearing can be selected based on the position of the main shaft. The actuators protrude from the housing top to the surface receiving the pressure or force from different angles that can be used to generate electricity using a generator and the actuators are positioned in a such a way that multiple actuators are engaged at once by the passing vehicle. The rack and pinion include gear that can be of various type such as a planetary gear system, or epicyclic gear train, which can comprise one or more outer gears and wherein, the attached gears increase or decrease the gear ratio or assist in translation of motion. However, this system, by its design, may be very costly to implement and maintain because it is situated/affixed "inside roadways". This means that when the invention is installed anywhere roadways currently exist, there will be sizable costs involved in ripping up/tearing out the existing road pavement to install the invention. Plus, since this system is affixed "inside roadways", consider the costs that will be involved to accessing the system's components for routine maintenance. Plus, this system can easily slow down the speed/velocity of vehicles. Thus, if the system were used in applications other than speed bumps or applications that slow vehicles down, then it seems vehicles will need to consume more energy in the course of their customary activity. When vehicles must consume more/additional energy to advance in order to produce electricity for other uses, it does not seem efficient/beneficial. The aforementioned items are just some areas of concern with this energy harvesting system.

Another prior art, JP2008255978 of Brier et al., discloses about an electric power generator "installed under the sidewalk or the roadway" using movement of a person or a vehicle in which the power generator is installed under a sidewalk or roadway for change in weight caused by traffic of the person or the vehicle. A shaft with teeth and spring is fixed to the tread board. The system is covered with an iron plate or rubber sheet. The generator is connected to a battery through a rectifier and regulator to store electricity. The stored electricity is used as a power source for an illumination lamp or other electric appliances. It seems this system will also be costly to install and maintain because it is situated "under the sidewalk or the roadway". Thus, since it will be installed under sidewalks or the roadways that means that areas other than those where brand new sidewalks are being poured, or brand-new roads are being laid, one would have to destroy existing infrastructure in order to install this apparatus. That would be a sizeable additional expense.

Accordingly, there is a need for an electrical power generating apparatus that 1) efficiently generates electrical power by utilizing and converting the movements of objects, such as a vehicle's tires, or people, etc. along/across surfaces, such as highways/streets in the course of their customary activity, 2) can be manufactured/produced and installed in a cost effective manner 3) does not destroy existing roadways/highways/pavement. 4) actually restores/repairs/extends the life of existing road surfaces, 5) can be easily and cost effectively maintained; 6) can generate significant torque to rotate electric power producing generator(s) without slowing down the forward speed/velocity of objects by anything more than negligible levels. Our innovative invention fulfills all the aforementioned needs and more.

SUMMARY OF THE INVENTION

The present invention discloses an electrical power generating apparatus. Specifically, the present invention relates to an electrical power generating apparatus for generating electrical power by utilizing and converting the moving weight and/or stopped weight of objects, such as but not limited to vehicle tires when affixed to a vehicle, and/or to the moving weight and/or stopped weight of people, etc. as they traverse/move across the top of platforms. Said platforms are placed on top of surfaces, for example road surfaces, highways, streets, and so forth. Objects will move along the top of the said platforms in the course of their customary activity. This invention focuses on harnessing/using the moving and/or stopped weight of an object via the platforms and its components when said weight is supported/transmitted to a surface as said objects move/advance across said surface. Thus, in the case of a vehicle we are referring to a vehicle's tires when said tire's treads come into contact with a surface. When vehicles/objects moves/advances across a surface, their weight/force is distributed to the surface along contact points where the vehicle's tires come into contact with the surface in any given time. For example, a typical vehicle (for example, a Car, SUV, and a pickup truck) on U.S. highways/roadways has its tires inflated in a range of approximately 30-35 pounds per square inch of tire pressure. Thus, the vehicle's weight is actually distributed throughout each square inch of each tire that contacts a road surface. So roughly 30-35 pounds of a vehicle's weight are distributed per square inch of each tire that contacts the road surface. Thus, the present invention is designed to limit the weight/force harnessed to a level at or below the actual weight of the vehicle that presses down on any given tire's contact point with a surface, so as not to slow down the advance of the vehicle by anything more than negligible amounts. This means the present invention does not require the vehicle to exert additional force to advance. Plus, when the present invention is installed in high traffic areas, then once a generator within the present invention starts rotating, even less energy from subsequent vehicles will be required to keep and/or advance its rotation, which allows still more electricity to be generated and further decreases the probability that a vehicle's speed will slow by anything more than negligible levels. Plus, since the present invention will improve/revamp road surfaces, it will actually cause vehicle's to advance more efficiently and thus consume even less energy. And since each platform of the present invention improves/revamps/covers road surfaces it saves tax payers money, and it also saves vehicle owners money by deferring costs of repairs to vehicle suspension systems and tires that are otherwise damaged by pot holed and otherwise damaged roadways. In the present invention, the platform is defined as one or more structures that contain one or more cavities which contain one or more items; objects will traverse/move/stop on/along said structures without said structures breaking/buckling under the weight/force of any said object(s) traversing/moving/stopping on/along said one or more structures because said structures are designed to accommodate/withstand the force/weight of the objects/traffic of the location(s) where they will be installed.

The apparatus can be configured to generate electrical power by converting either downward, upward, forward, backward, or any combination of the aforementioned motions/forces into rotational motion. In one embodiment, the apparatus captures mechanical energy, via a downward motion channeled through a rotational mechanism, and converts the captured mechanical energy into electricity that can be used for different applications. Force is exerted upon surfaces by the moving weight of object(s) such as but not limited to a vehicle's tires affixed to the vehicle, or people, as they traverse across surfaces, for example, road surfaces, highways, streets, etc. in the course of their customary activity.

In one embodiment, the apparatus comprises one or more platforms, one or more protrusions, one or more generators capable of producing electricity, one or more flywheels/mechanical energy storage element(s), one or more bearings, and/or any combination thereof. In one embodiment, the platforms are configured to be laid on top of a surface and easily allow an object, for example a vehicle's tires to traverse over it without slowing down the overwhelming majority of vehicles by anything more than negligible levels. The platforms should be affixed/secured together and/or to the surface to prevent hazards resulting from the shifting/movement of said platforms. The platforms should be capable of even supporting the weight of rush hour traffic that is stopped or passing over the platforms, without breaking. In one embodiment, each platform has unique identifier(s) that differentiate the identification of any platform and/or groups of platforms from other platforms and/or groups of platforms. In one embodiment, the surface is at least any one of, but not limited to, streets, roads, avenues, paths, highways, expressways, freeways, thruways, bridges, tunnels, toll areas, interstates, superhighways, turnpikes, arteries, parkways, on-ramps, off-ramps, tunnels, bridges, sidewalks, walkways, paths, trails, and floors. In one embodiment, the protrusions are positioned upward and/or angled and move through apertures/holes located in/through a top portion of the platform, and through guides inside the platform. In one embodiment, one or more or any or any combination of platform(s), support structures inside the platform(s), components of the platforms(s) are configured to be leveled/aligned using one or more shims and/or one or more leveling members. In one embodiment, each protrusion is configured to depress and/or move downward and upward via at least one reset member and through one or more apertures or holes located in/through a top portion of the platform when the object such as a vehicle's tire(s) strikes a protrusion. An object can strike/push/depress one protrusion at a time, and/or in succession, and/or more than one protrusion at the same time, and/or any of the aforementioned.

In one embodiment, one or more protrusions are configured to move through one or more aperture(s)s, and slide through/within one or more guides. The guide(s) direct the motion of the protrusion(s). In one embodiment a guide incorporates one or more stops/brakes such as but not limited to a locking pin, brake ring, stopper, member, device, and/or the combination thereof. In one embodiment, the stop/brake for example, a pin is positioned inside the slits/channels of a guide. After an object has passed over a protrusion and a reset member decompresses, then the protrusion will be forced to stop at the reset position by means of one or more brakes/stops, for example, a pin. In one embodiment, the object(s) could be, but are not limited to, the tires of vehicles, such as cars, trucks, buses, SUVs, semi-trucks with trailer, semi-trucks without trailer, tractor trailers, trailers, RVs, campers, limousines, cabs, vans, motorcycles, scouters, and/or, any other objects that convey and/or transport a person, persons, goods, or materials, and/or people.

In one embodiment, teeth are incorporated and/or affixed to at least one protrusion and said protrusion is connected in an operative manner to one or more shafts via a gear, thereby rotating the one or more shafts by converting downward pressing motion of the one or more protrusions to rotational motion of one or more shafts; additionally, in on when the protrusion reverses and resets upward the one way rotation of the one or more shafts is undisturbed because in one embodiment said one or more shafts is/are affixed/coupled to one or more one-way bearing, sprag clutch bearing, freewheel clutch bearing, ratchet system. In one embodiment, each aforementioned gear is affixed to or incorporated with at least any one of a one-way bearing, sprag clutch bearing, freewheel clutch bearing, or ratchet system. In one embodiment, the generator is coupled directly to the flywheel or part of the flywheel or vice versa. In another embodiment, the generator is coupled indirectly to the flywheel or vice versa. In one embodiment the generator and/or flywheel is/are coupled to a shaft which can be rotated and said shaft is coupled to one or more or any or any combination of gearbox, gear train, planetary gear, bearing, one-way bearings, for the purpose of generating electrical power by converting the downward motion of one or more protrusions into rotational motion of one or more generators. In one embodiment, each generator and flywheel could be either separated, combined together, or a combination of both. In one embodiment, each said generator and flywheel is secured to one or more or any or any combination of shaft, gearbox, bearing. In one embodiment, the one or more shafts are fastened to one or more or any or any combination of the generator(s), flywheel, pulley, roller, sprocket, bearing, one-way bearing, sprag clutch bearings, freewheel clutch bearings, ratchet system, gears, gearbox, to transmit torque using one or more fasteners, wherein the fasteners are one or more or any or any combination of a keyway and machine key, a set screw, an adhesive, a latch, a catch, clips, wires, welding, band, a crimp, soldering, brazing, dowels, claps nuts, bolts, screws, pins, split pins, tie, straps, clamps, rivets, threaded shaft, a press fit, shoulder, and/or other fastener(s). In one embodiment, the shafts are fastened to one or more or any or any combination of components include the generator, flywheel, pulley, roller, sprocket, bearings, one-way bearings, sprag clutch bearings, freewheel clutch bearings, ratchet system, gear, and the gearbox to transmit torque, wherein the said components are prevented from slipping/moving out of their predetermined positions/locations as a result of rotation and/or vibration via constraints affixed to the shaft and/or components and/or both; wherein the constraints include one or more stops, brakes, locks, set screws, welding, band, an adhesive, latches, clips, wires, a crimp, solder, brazing, dowel, clasps, tie, straps, clamps, rivets, threaded shaft, retaining ring, a press fit, shoulder, other restraints(s) constraint(s), and other constraints. In one embodiment, the one-way bearing, sprag clutch bearing, freewheel clutch bearing, ratchet system is configured to provide a continuous one direction rotating torque to drive the one or more shafts and/or associated components. In one embodiment, the protrusions are further configured to be installed on opposite sides of the same shaft, and still rotate the one or more shafts in the same direction. In one embodiment, the gearbox contains a gear train and/or planetary gear(s).

In one embodiment, each platform having one or more cavities inside the platform and a protective cover. In one embodiment, the protective cover comprises a non-slip surface or surfaces on an upper exterior section to assist object(s) for traversing/traveling/moving on the top of said platform. In one embodiment, the platforms further comprise of sloping/inclining/declining surfaces around outside exterior sides of the one or more platforms, where the sloping/inclining/declining surfaces bridge the top sides of the platforms to the surface for smooth traveling of object and/or vehicles on and off said platforms, and said sloping/inclining/declining surfaces are unnecessary to bridge the tops of adjoining or near adjoining platforms in the areas where the tops of more than one platform adjoin or nearly adjoin. In one embodiment, each platform comprises one or more or any or any combination of sensor(s), meter(s), gauge(s) for detecting/reading/registering current (amps), voltage (volts), other electrical data, other performance input(s)/data from the one or more or any or any combination of generator(s), flywheel(s), platform components/contents. In one embodiment, the input from said one or more or any or any combination of, but not limited to, sensor(s), meter(s), gauge(s)s are accessed locally. In another embodiment, the input from said one or more or any or any combination of, but not limited to, sensor(s), meter(s), gauge(s) are reported/accessed remotely. In another embodiment, the input from said one or more or any or any combination of, but not limited to, sensor(s), meter(s), gauge(s)s can be accessed locally and/or remotely, additionally the data can be communicated via wireless or wired transmission, or both.

In one embodiment, the protrusions are at least any of, but not limited to, shafts, rods, poles, strips, bars, pistons, levers, and/or fixtures that are affixed to, and/or incorporated with one or more tooth/teeth, gear(s), gear rack(s), pulley(s), roller(s), sprocket(s), components of said items, and/or any combination thereof. In one embodiment, each guide of the protrusion is configured to guide/direct the motion/positioning/re-positioning of the protrusion(s) and/or the reset member(s) and also hold the protrusion(s) and/or reset member(s) in proper location(s)/position(s). In one embodiment, the gear(s) are selected from at least any one of cylindrical gear(s), spur gear(s), helical gear(s), gear racks(s), rack gear(s), pinion gear(s), rack and pinion gear(s), bevel gear(s), miter gear(s), worm and worm gear(s), screw gear(s), internal gear(s), gear train(s), planetary gear(s), epicyclic gear(s), linear gear(s), item(s) with teeth, and/or any combination thereof.

In one embodiment, the reset member is at least any one of an elastic member, spring or springs, elasticized cord or cords, pulley and counter weight system, lever and fulcrum. In another embodiment, the reset member is comprised of repelling magnets. In another embodiment, the reset member is a compression device and/or comprised of fluids and/or gases that compress when force is applied, and decompress when the force has passed. In one embodiment, the guides are made of a material that includes a ferrous material, or a non-ferrous material, and/or the combination thereof. In one embodiment, each reset member is located at a bottom portion of each protrusion and securely positioned. In another embodiment, each reset member is located at a top portion of each protrusion and securely positioned. In one embodiment the reset member is configured to quickly reposition/decompress the protrusion to its original state when the object passes away from the protrusion. In one embodiment, a holder/item is configured to prevent the reset member from dislocating/disconnecting, and/or bulging outward when the protrusion is decompressed by the object.

In another embodiment, a protrusion is positioned within the channel of a guide and slides within said channel and is reset via elasticized cords/members. The protrusion is configured to depress and/or move downward via the weight of the overhead object and back upward via the elasticized cords/members and through one or more apertures or holes located in/through a top portion of the platform when the object, for example, a vehicle's tire(s), strikes/pushes/depresses one or more protrusions at the same time and/or in succession. In one embodiment, the elasticized cords/members are securely affixed to one or more sides of the guide or other to other items inside the platform and are configured to move up/down/up and quickly reposition the protrusion to its original state when the object, for example, a vehicle's tires, move away from the protrusion. In one embodiment, the elasticized members are affixed/fastened to a surface to keep them from dislocating. In one embodiment each guide is configured to guide/direct the motion/positioning/re-positioning of the protrusion(s) and the reset members and also hold the protrusion(s) and the reset members in their proper location(s)/position(s).

In another embodiment, the protrusion is a shaft that can slide through a guide and is directed within the guide and incorporates a reset member. In another embodiment, at least a portion of a protrusion is a shaft positioned inside/within a reset member, for example, a spring, and thus prevents the spring from bending/bulging outward while still allowing the reset member to compress freely. In one embodiment, the protrusion is secured to a surface using a fastener and/or adhesive.

In one embodiment, the underside of the protective cover incorporates/integrates one or more resistive conductors for melting ice and/or snow to prevent them from accumulating on the platform. In one embodiment, the resistive conductors are affixed or integrated into, but not limited to, the protective cover. In some embodiments, the resistive conductors are affixed or integrated to, but not limited to, an underside of the protective cover. In one embodiment, the resistive conductors heat up on the flow of electric current to melt the snow and/or ice that would otherwise accumulate on the platform. In an exemplary embodiment, the resistive conductors could be connected to, but are not limited to, insulated and/or non-insulated electric conductor(s) in order to provide electric current to the resistive conductors of the protective cover. In another embodiment, the resistive conductors are affixed to the protective cover and/or embedded inside the top protective cover.

In one embodiment, each platform further comprises a lubrication system configured to lubricate the components of the electrical power generating apparatus using one or more or any or any combination of a conduit, a channel, a hose, a duct, a vein, and a tube, wherein each platform further comprises one or more entry and/or exit port(s) inside and/or outside of the platforms through which lubricant is applied by one or more or any or any combination of filling, pumping, draining, flushing, and/or transferring the lubricant. In one embodiment, the apparatus further comprises one or more or any or any combination of energy storage devices and/or systems comprising capacitor(s), and/or battery(s), which are used to store the electricity/power produced by the generators in one or more platforms, wherein said capacitor(s) and/or batteries are located inside and/or outside the platform and connected to one or more platforms.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of the embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is therefore indicated by the appended claims rather than by the foregoing and subsequent descriptions. All changes that come within the meaning and range of equivalency of the claims are to be embraced within their scope.

Figure 1:
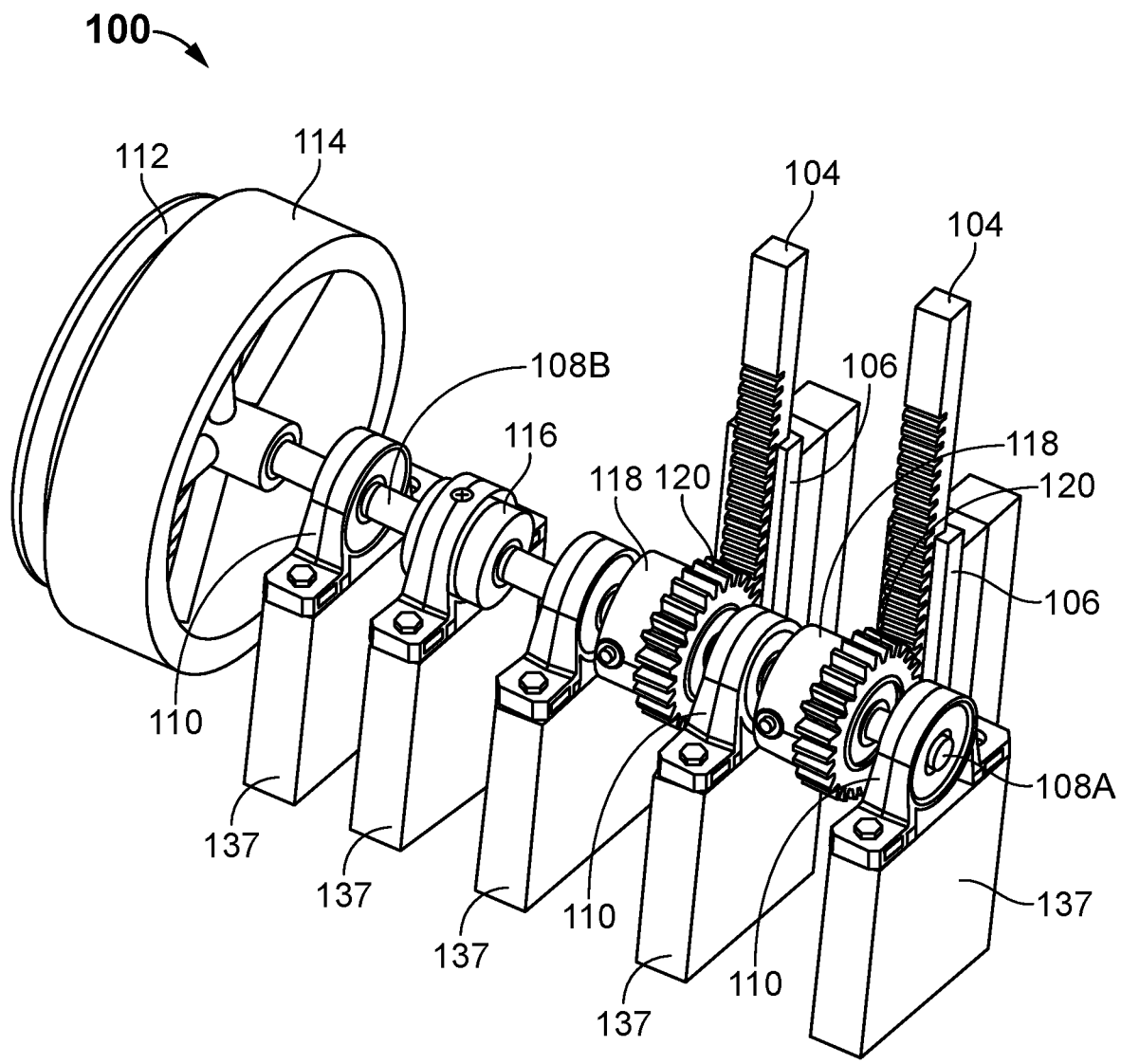
FIG. 1 shows a perspective view of one of a number of electrical power generating apparatuses largely located inside a platform, in an embodiment of the present invention.

FIG. 1 refers to one electrical power generating apparatus 100 located largely inside one or more platforms in one embodiment is disclosed. Additionally, a number of said power generating apparatuses 100 can be located in a platform 122. In one embodiment, the apparatus 100 is configured to generate electrical power by converting mechanical energy into electrical power using a generator 112. In one embodiment, the apparatus 100 captures mechanical energy, via a linear/angled downward/downward-upward motion, converts it to rotational motion, and converts the captured mechanical energy into electrical energy for use in different applications. The force/weight exerted upon surfaces by the moving or stopped weight of tires of motorized vehicles, tires of non-motorized vehicles, and/or people in the course of their customary activity will be harnessed by this power generating apparatus 100 which is located largely inside a platform. The actual size of the apparatus 100 could vary and could be smaller or more compact, or larger, and it/they fit largely inside the platform 122.

In one embodiment, the apparatuses 100 are located largely inside one or more platforms and the top of the platform 140 (shown in FIG. 2), and one or more protrusions 104, and one or more generators 112 and one or more flywheel/mechanical energy storage element 114 are incorporated into the apparatus 100. In one embodiment, the platforms 122 are configured to be laid on top of a surface and are configured to allow an object, for example vehicle tires, to pass/traverse/drive over it in the course of their customary activity, and if they slowed down the speed/velocity of the vehicles it would not be by anything more than negligible amounts. The platforms 122 should be affixed/secured together and/or to the surface to prevent hazards resulting from the shifting/movement of said platforms 122. In one embodiment, each platform 122 has unique identifier(s) that differentiate the identification of any one or more platforms from other one or more platforms, and said unique identifier(s) are associated with said platforms either physically, digitally, or both. In one embodiment, the surface is at least any one of, but not limited to, streets, roads, avenues, paths, highways, expressways, freeways, thruways, bridges, tunnels, toll areas, interstates, superhighways, turnpikes, arteries, parkways, on-ramps, off-ramps, tunnels, bridges, sidewalks, walkways, paths, trails, and floors. In one embodiment, the protrusions 104 are vertical and/or angle and move within the platform 122 using one or more guides 106. In one embodiment, each protrusion 104 is configured to depress and/or move downward and upward via a reset member 126, 130 (shown in FIG. 2, 3, 4, 5, 15) and through one or more apertures or holes located in/through a protective cover 140 of the platform 122 when the object strikes or pushes the one or more protrusions 104 at the same time, in succession, and/or any combination thereof. In one embodiment, one or more protrusions 104 are configured to move through one or more aperture(s)/holes, and slide through/within one or more guides 106. The guide(s) 106 direct the motion of the protrusion(s) 104. In one embodiment, at least one brake/stop 124 (shown in FIG. 2) and 136 (shown in FIG. 5) could be a pin or locking pin, or some type of stopper and/or the combination thereof, which are used to prevent the protrusions 104 from escaping the guide. In one embodiment the brake/stop 124 moves within/inside/through slits/channels 107 of the guide. In one embodiment the brake/stop 124 is secured to the bottom of the protrusion/vertical shaft 134 (shown in FIG. 5). In one embodiment, the brake/stop 136 (shown in FIG. 5) is secured to the bottom of the vertical shaft/protrusion 134. In one embodiment, the objects are, but do not have to be limited to, the tires of vehicles such as cars, trucks, buses, tractor trailers, vans, and thereof. In another embodiment, the objects are people.

In one embodiment, teeth are incorporated and/or affixed to at least a portion of one protrusion 104 and said protrusion 104 is connected in an operative manner to a shaft 108A via a gear 120, thereby rotating the shafts 108A, 108B by converting the linear/angled downward/downward-upward motion of the one or more protrusions 104 to rotational motion; additionally, when the protrusion 104 reverses and resets upward, the one-way rotation of the shaft 108A is unhindered because said shaft 108A is affixed/coupled to at least one one-way bearing, and/or sprag clutch bearing, and/or freewheel clutch bearing, and/or ratchet system 118. The protrusion(s) 104 and components connected in an operative manner to the protrusion(s) 104 are constructed of material(s) that withstand/endure the powerful forces and torque applied to said protrusions 104 and components, without breaking. In one embodiment, one-way bearing, and/or sprag clutch bearing, and/or freewheel clutch bearing, and/or ratchet system 118 is affixed to and/or incorporated into the gears 120. In one embodiment, the generator 112 is coupled to the flywheel 114 via a shaft 108B. In one embodiment, the flywheel 114 is incorporated with the generator 112. In one embodiment, a gearbox 116 is positioned or stationed between the 2 shafts (108A and 108B) in order to accelerate the revolution per minute (RPM) of the one or more generators 112, flywheels 114, shafts 108B, or any combination thereof. In one embodiment, the gearbox 116 is affixed/integrated to/with the generator 112, and/or flywheel 114, or both. In one embodiment, a gear 120, or gear teeth are incorporated and/or affixed to the flywheel 114 and/or the outside diameter of the flywheel 114 and a protrusion 104 can interact with the said gear 120 or gear teeth associated with said flywheel 114 to convert the overhead pushing force of an object into the rotational force of a flywheel 114 and the flywheel can be affixed to a shaft 108A, 108 B that can be affixed to one or more or any or any combination of generator 112, gearbox 116, bearings 110, flywheel 114, and other items. In one embodiment, a gear 120, or gear teeth are incorporated and/or affixed to the generator 112 and/or the outside diameter of the generator 112 and a protrusion 104 can interact with the said gear 120 or gear teeth associated with said generator 112 to convert the overhead pushing force of an object into the rotational force of a generator 112 and the generator 112 can be affixed to a shaft 108A, 108 B that can be affixed to one or more or any or any combination of flywheel 114, gearbox 116, bearing 110, other items. In one embodiment, the horizontal shafts (108A, 108 B) run through the bearings 110 and/or at least one one-way bearing, and/or sprag clutch bearing, and/or freewheel clutch bearing, and/or ratchet system 118. In one embodiment, electrical power is generated by converting the linear/angle, downward/downward-upward motion of one or more protrusions 104 into rotational motion that rotates one or more flywheels 114 and generators 112. In one embodiment, the one-way bearings, and/or sprag clutch bearings, and/or freewheel clutch bearings, and/or ratchet system 118 are configured to provide a continuous one direction rotating torque to drive the shafts (108A and 108B). In one embodiment, the one or more generators 112 positioned/located inside the platform(s) 122 is/are composed of one or more rotors and/or one or more stators. In one embodiment, at least one flywheel 114 incorporates a gear and/or at least one one-way bearing, and/or sprag clutch bearing, and/or freewheel clutch bearing, and/or ratchet system 118. In one embodiment, at least one combined flywheel 114 and generator 112 incorporates a gear 120 and/or at least one one-way bearing, and/or sprag clutch bearing, and/or freewheel clutch bearing, and/or ratchet system 118. In a preferred embodiment, the gearbox 116 is immobilized it its position so that the input shaft/item 108A is able to transfer torque through the gearbox 116 onto the output shaft via the gears inside the gearbox 116; and the fasteners that immobilize the gearbox 116 are capable of enduring/withstanding the powerful input and/or output torque and stresses being placed on the gearbox 116 in order to prevent the gearbox 116 itself from rotating along with the gears inside the gearbox 116.

In an exemplary embodiment, at least one stator of each generator 112 is secured/immobilized inside a platform 122 so that at least one rotor of said generator 112 rotates around the at least one said stationary stator of said generator 112 in order to generate electricity. In one scenario the stator contains insulated coils and the rotor contains magnets. In another scenario the stator contains magnets and the rotor contains insulated coils.

In one embodiment, the protrusions 104 are further configured to be installed on opposite sides on the same shaft 108A/108B and still rotate the shaft in the same one direction. In one embodiment, the gearbox 116 contains one or more or any combination of gears, one or more gear trains and/or one or more planetary gear(s). In one embodiment, the gearbox 116 contains lubricant to lubricate the gears. In one embodiment, when a protrusion 104 reverses/resets back to its start/reset/original position, the one-way bearing, and/or sprag clutch bearing, and/or freewheel clutch bearing, and/or ratchet system 118 will not halt or hinder the ongoing one-way rotation/spin of the horizontal shafts 108A and 108B.

In one embodiment, the apparatus 100 comprises one or more flywheel(s) 114, which are secured to one or more or any or any combination of shaft, generator, and is/are positioned inside/within the platforms and below the top of the protective cover 140 and/or associated with the platforms 122. The flywheel(s) 114 is/are configured to store mechanical energy generated from rotating shafts 108A, 108B, and said shafts are rotated by converting the linear/angle, downward/downward-upward motion of the one or more protrusions 104 to rotational motion using gears 120 affixed to or incorporated with a one-way bearing, and/or sprag clutch bearing, and/or freewheel clutch bearing, and/or ratchet system 118. The rotation of the flywheel(s) 114 will power/move/rotate indirectly or directly one or more or any or any combination of flywheel(s) 114, generator(s) 112, shaft(s) 108A, 108B, torsion object(s), gear(s), other item(s). In one embodiment, the aforementioned downward pushing force through a protrusion 104 first rotates and/or passes through gear(s) 120, gearbox(es) 116, which magnify/accelerate the revolution per minute (RPM) used to power/move/rotate indirectly or directly one or more or any or any combination of gear(s), shaft(s) 108A, 108B, flywheel(s) 114, generator(s) 112, torsion object(s), other item(s). In one embodiment, one or more flywheel(s) 114 is affixed directly and/or indirectly to one or more or any or any combination of shaft(s) 108A, 108B, gear(s) 120, bearing/bushing/sleeve/roller(s) 110, and generator(s) 112. In one embodiment, the energy of one or more rotating flywheel(s) 114 is tapped into/accessed/used at any time, including but not limited to, any of the following or any combination of the following: when the flywheel(s) 114 reach a specific RPM; when the flywheel(s) 114 are fully charged and/or partially charged; when/after one or more predetermined event(s) have occurred; at/after/before specific time periods; at/after/before different/inexact time periods. The apparatus 100 shows the flywheel 114 and generator 112 in a horizontal position similar to the horizontal position of the shafts (108A and 108B); yet the flywheel 114, generator 112, shafts 108A, 108B and other items could instead be positioned flat, and/or any range of angles inside the platform 122. In one embodiment, each generator 112 and flywheel 114 and/or gearbox(es) 116 could be either separated, combined together, or a combination of both. In one embodiment, each generator 112 and flywheel 114 are secured to one or more or any or any combination of the shafts (108A and 108B), gearbox 116, and the bearings 110.

In one embodiment, one or more support structures/items 137 are used to elevate and/or support components inside the platform 122. In one embodiment, the support structures/items 137 are securely fastened to the base of the platform 122. In another embodiment, the support structures/items 137 are incorporated into the platform structure itself. The support structures/items 137 are made of material(s) that will support the force and stress generated by the ongoing motion of the protrusions 104, and/or one or more or any or any combination of generator(s) 112, flywheel(s) 114, shafts(s) 108A, 108B, gears 120, gearboxes 116. In one embodiment the support structures/items 137 elevate and support one or more or any or any combination of flywheels 114, generators 112, shafts 108A, 108B, gearboxes 116, bearings 110, gears 120. The elevation of said components also allows a protrusion 104 to move a sufficient distance downward and upward while engaging with said components in order to transfer force initially applied to said protrusions 104. Because the support structures/items 137 elevate components they enable the apparatus to accommodate larger diameter flywheels 114, generators 112, and other components while engaging with one or more protrusions 104. The support structures/items 137 also lift the components up off the floor of the platform 122 and thus protect the components inside the platform 122 from water and/or debris that that may seep into platform 122 or accumulate at the base of the platform 122. The support structures/items 137 also facilitate the alignment of the shaft(s) (108A and 108B) and components affixed to said shaft(s) (108A and 108B) so that said shaft(s) (108A and 108B) and components will rotate efficiently. In one embodiment, one or more shims will be incorporated and/or affixed to the top, bottom, and/or into of any support structure/item 137 to level said support structures/items 137 and/or any components it is supporting.

In one embodiment, each component is secured/affixed to any portion of the shaft 108A, 108B and is secured/affixed in such a manner that said component is prevented from slipping/moving out of its predetermined position/location as a result of the rotation and/or vibration of any component. So, for example, in the case of a gear 120 secured/affixed to a shaft 108A via a keyway and machine key, said gear 120 could potentially shift/move to the left or right if one or more or any or any combination of additional constraints were not installed/applied to prevent it from doing so. In one embodiment, one or more or any combination of constraints may be used such as, but not limited to, press fit, shoulder, one or more stop, brake, lock, set screw, weld, band, adhesive, latch, clip, wire, crimp, solder, brazing, dowel, clasp, tie, strap, clamps, rivets, threaded shaft, retaining rings, and/or other items.

In one embodiment, the protrusions 104 are at least any of, but not limited to, shafts, rods, poles, strips, levers, bars, pistons, and fixtures with one or more gear(s), gear rack(s), teeth, pulley(s), roller(s), sprocket(s) and any combination thereof incorporated and/or affixed to said protrusions. In one embodiment, the back side of the protrusion 104 (the side without linear teeth) will move within/through a guide 106 and said guide 106 will help the protrusion 104 to move properly in its intended route/direction. This will also remove the risk of bending the horizontal shaft(s) 108A, 108B inside the platform 122 that is/are affixed to at least one gear 120 and that interacts with at least one protrusion 104. The location, position of the guide 106 and the aperture 142 of the platform 122 through which the protrusion 104 passes will keep that protrusion 104 moving properly. In one embodiment, the guide 106 is located around one or more parts/section(s) of any protrusion 104.

In one embodiment, one or more shafts 108A, 108B contain at least some amount of one or more keyway/keyslot and said shaft(s) (108A and 108B) could be connected/affixed via one or more machine key(s) to one or more or any or any combination of generator(s) 112, flywheel(s) 114, pulley(s), roller(s), sprocket(s), bearing(s) 110, one-way bearing, and/or sprag clutch bearing, and/or freewheel clutch bearing, and/or ratchet system 118, gears 120, gearbox(es) 116, combination of gears, torsion object(s), sprocket(s), and other components/items to transmit torque. In one embodiment, one or more shafts 108A, 108B are connected/affixed with one or more or any or any combination of shaft(s), generator(s) 112, flywheel(s) 114, pulley(s), roller(s), sprocket(s), bearing(s) 110, one-way bearing, and/or sprag clutch bearing, and/or freewheel clutch bearing, and/or ratchet system 118, gears 120, gearbox(es) 116, combination of gears, torsion object(s), sprocket(s), and/or other components/items to transmit torque by one or more or any or any combination of fasteners, such as, but not limited to, couplers, set screws, adhesives, latches, catches, clips, wires, weld, band, crimp, solder, brazing, dowel, clasp, nut, bolts, screws, pins, split pins, tie, straps, clamps, rivets, keyways and machine keys, a press fit, shoulder. In one embodiment, the rotors/component(s) of one or more or any combination of generator(s) 112, shaft(s) 108A, 108B, flywheel(s) 114, other component(s) inside one or more platform(s) 122 are linked/joined/united/married together using, but not limited to, one or more chain(s), cable(s), belt(s), gear(s), other member(s). In a preferred embodiment, the fasteners used throughout the power generating apparatus 100 are constructed of material(s) that withstand/endure the powerful forces and torque applied to the components/items they fasten together, without breaking.

In one embodiment, the gear(s) 120 are selected from at least any one of cylindrical gear(s), spur gear(s), helical gear(s), gear racks(s), rack gear(s), pinion gear(s), rack and pinion gear(s), bevel gear(s), miter gear(s), worm and worm gear(s), screw gear(s), internal gear(s), gear train(s), planetary gear(s), epicyclic gear(s), linear gear(s), item(s) with teeth, and any combination thereof. In one embodiment, the gear ratio of one 1 protrusion with gear teeth 104 to one associated horizontal shaft 108A, 108B via a gear 120 are different than the gear ratio of any other protrusion with gear teeth 104 to its associated horizontal shaft 108A, 108B via the gear 120. In one embodiment, the gear ratio of one protrusion 104 with gear teeth to any one or more associated horizontal shaft(s) 108A, 108B via a gear 120 are the same as the gear ratio of any other protrusion 104 with gear teeth to its associated horizontal shaft(s) 108A, 108B via the gear 120.

In one embodiment, the one or more aforementioned shafts 108A, 108B and/or one or more aforementioned objects located inside or that are associated with one or more platforms 122 is/are affixed to one or more and/or any or any combination of generator(s) 112, flywheel(s) 114, bearing(s) 110, bushing(s), sleeve(s), roller(s), one-way bearing, and/or sprag clutch bearing, and/or freewheel clutch bearing, and/or ratchet system 118, gears 120, gearbox(es) 116, combination of gears, torsion object(s), sprocket, item(s) with teeth, coupling(s), other components/items.

In one embodiment, when a protrusion 104 is depressed downward and/or upward, it directly or indirectly moves/rotates/powers any one or more and/or any or any combination of the following: shaft(s) 108A, 108B, generator(s) 112, flywheel(s) 114, pulley(s), roller(s), sprocket(s), bearing(s) 110, one-way bearing, and/or sprag clutch bearing, and/or freewheel clutch bearing, and/or ratchet system 118, gears 120, gearbox(es) 116, combination of gears, torsion object(s), sprocket(s), other components/items.

In one embodiment, the brake(s)/stop(s)/member(s)/device(s) is/are affixed/coupled/incorporated into one or more or any or any combination of the protrusion(s) 104, reset member(s) 126, 130 other item(s), that will secure and stop the protrusion(s) 104 and/or reset member 126,130 in their proper reset position(s) so that the protrusion(s) 104 are again ready to capture/recycle the energy released by the next overhead passing and/or stopped object/tire.

In one embodiment, the aforementioned one or more gear(s)/gearing/teeth incorporated into and/or on/affixed to at least some portion of the protrusion 104 are of the same and/or different sizes, and/or types, for such factors that include but are not limited to, the number of gear teeth, gear pressure angle(s), gear tooth depth(s) thickness, diameter of gears, gear material, gear diametral pitch, gear pitch diameter, gear circular pitch, gear hub diameter, of any other protrusion 104 and/or adjacent gear(s) 120.

In one embodiment, the apparatus 100 further comprises one or more or any or any combination of transmission(s) which are incorporated into, outside, or both inside and outside of the platform(s) 122. The transmission(s) are optimized for one or more or any or any combination of input force such as, but not limited to, starting force, stopping force, slower force, faster force. In one embodiment, the transmission(s) operate either manually, automatically, or any combination thereof. In one embodiment, one or more or any or any combination of transmission(s) are used to rotate directly, indirectly, or both, one or more or any or any combination of generator(s) 112, shaft(s) 108A, 108B, located inside, outside, or inside and outside of the platforms 122.

In one embodiment, the one or more transmissions may be composed of, but not limited to, one or more or any or any combination of gear(s), gearing(s), linear gear(s), gear ratio(s), epicyclic gear(s), planetary gear(s), gear train(s), gearbox(es), belt(s), pulley(s), sprocket(s), chain(s) roller(s), clutch(s), torque converter(s), fluid(s), flywheel(s), generator(s), other item(s). In one embodiment, the apparatus 100 further comprises different types of transmissions including any one or more or any or any combination of the following, but not limited to, manual, automatic, non-synchronous, automated manual, sequential manual, bicycle gearing, dual clutch, continuously variable, infinitely variable, electric variable, electric, hydrostatic, hydrodynamic, hybrid(s), hydraulic, other types of transmissions. In one embodiment, the apparatus 100 maximizes the rotations per minute (RPM) of shafts 108A, 108B which in turn rotate one or more or any or any combination of the generators 112, flywheels 114, gearboxes 116. In another embodiment, the apparatus 100 maximizes the rotations per minute (RPM) of one or more or any or any combination of generator(s) 112, flywheels 114, gearboxes 116 directly; in either embodiment, the objective is to produce electricity, by harnessing the force of the passing overhead object, for example, a vehicle's tires without slowing down the moving object by anything more than negligible levels. In one embodiment, the transmission contains transmission fluid.

In one embodiment, each platform 122 is equipped with and/or be affixed to/with, one or more fail-safe(s) for preventing the protrusion(s) 104 from remaining in a protruded/extended position above the top of the protective cover 140 of the platform 122 and/or preventing the protrusion(s) (104 and 103 (shown in FIGS. 15A and 15B)) from being depressed fully into the platform 122, when an object, for example, a vehicle's weight distributed through a tire, of minimum predetermined weight/force attempts to depress the protrusion (104 and 103) into the platform 122. In one embodiment, the fail-safe(s) ensure the protrusion(s) 104, 103 will be depressed and/or remain depressed below the top of the protective cover 140 of the platform 122 when an object, for example, a vehicle's tire that transfers a minimum predetermined weight and/or force tries/attempts to depress the protrusion(s) 104, 103 into the platform 122 when the apparatus 100 would otherwise not function properly. In one embodiment one or any combination of protrusion 104, 103, gearbox 116, gear 120 will be engineered to fail or break away in order to prevent a protrusion 104, 103 from remaining in an upright position when a predetermined force or greater has been applied to said protrusion 104, 103. So, for example, when a Motorcycle tire rolls over a protrusion 104,103 then that protrusion 104, 103 must not lock/freeze in place and/or fail to depress into the platform 122, because that could possibly cause a motorcycle rider to lose control and experience serious physical harm/injury. If any object/vehicle tire of a minimum predetermined weight passing overhead were to fail to depress the protrusion 104, 103 into the platform 122 it could cause the object/vehicle tire to slow down because the protrusion 104, 103 becomes a bump/hump, and/or it could possibly cause harm or other unintended consequences. In one embodiment, one or more fail-safe(s) associated with one or more or any or any combination of the protrusion 104,103 shaft(s) 108A, 108B, gearbox 116, and gears 120 and will effectively prevent this potential problem from occurring.

In one embodiment, the gears 120, gearbox 116 and/or any other moving parts/components of the apparatus 100 are lubricated using a lubrication system. Lubrication is necessary for the gears 120, gearbox 116, and/or other moving parts/components to operate properly and to protect them from becoming damaged. In one embodiment, each platform 122 has one or more entry and/or exit port(s) inside and/or outside the platform(s) 122 through which the lubricant is applied by either filling, pumping, draining, flushing, and/or transferring to protect the gears 120, gearbox 116, and/or other moving parts/components. In one embodiment, the lubrication system uses one or more or any or any combination of, but not limited to, sealed containers(s), conduit(s), channel(s), hose(s), duct(s), vein(s), tube(s) to lubricate component(s)/part(s) of one or more platforms 122. The lubrication is applied/transferred either during the same lubrication instance, or during different lubrication instances, or a combination of both. The maintenance of a lubrication system may or may not require direct physical access to the contents inside the platform(s) 122 in order to lubricate the said contents. In one embodiment, the lubricant of the lubrication system is replaced/recycled/changed without having to open the cover or similar entryway of the platform 122.

In one embodiment, the platform 122 further comprises one or more energy storage devices and/or systems such as, but not limited to, capacitor(s) and/or battery(s), which are used to store the electricity/power produced by the generators 112 in one or more platforms 122. In one embodiment, the capacitor(s) and/or battery(s) can be located inside and/or outside a platform 122 and could be connected to one or more platforms 122. In one embodiment, the electrical power produced by the generators 112 is securely transferred to one or more power grids and/or one or more energy storage devices and/or systems using power conductors/cables. In one embodiment, the power conductors/cables associated with the platform 122 are insulated.

Figure 2:
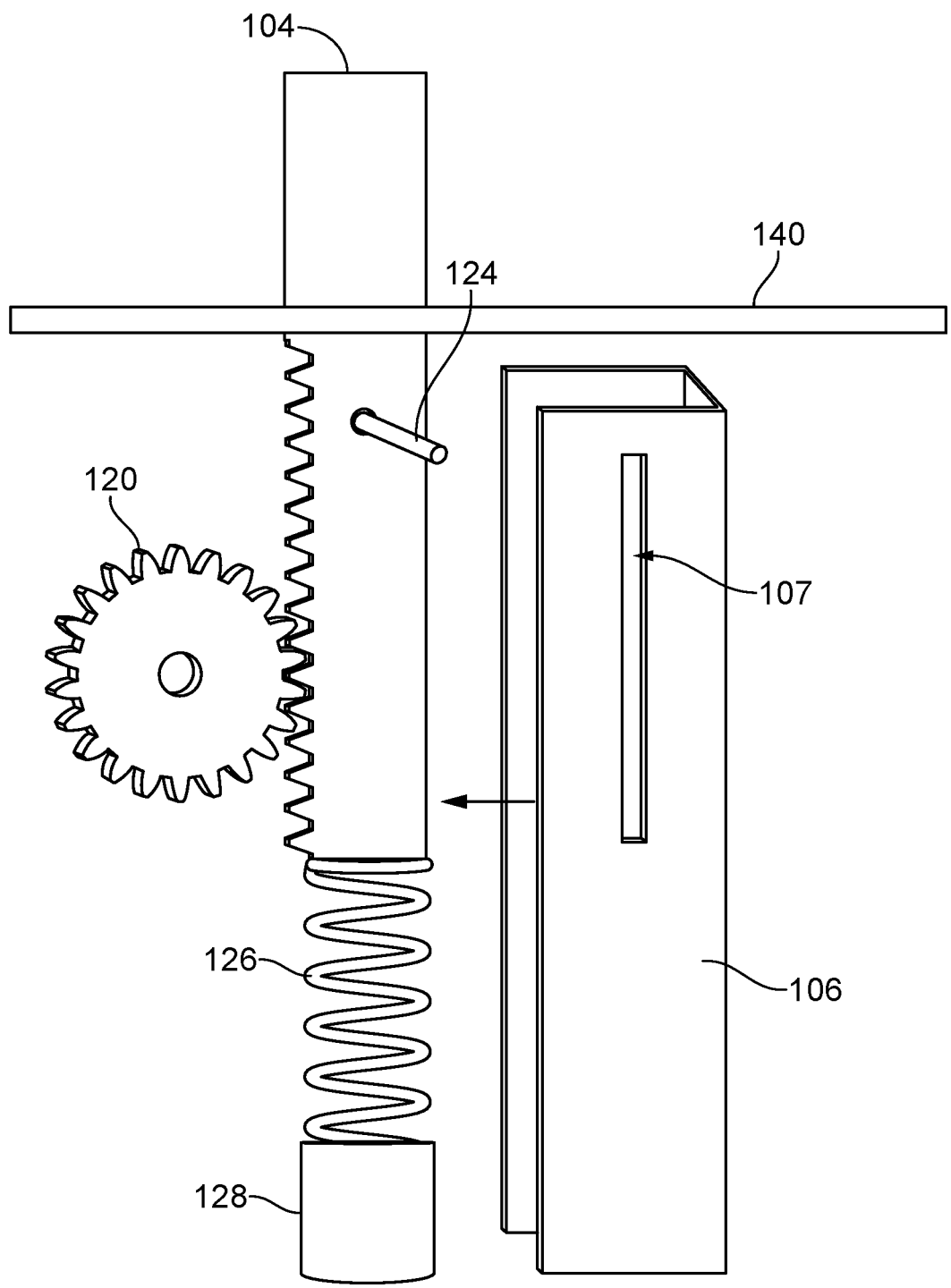
FIG. 2 shows a side view of a protrusion, reset mechanism, and protrusion guide of the electrical power generating apparatus and its interaction with a gear which will drive a horizontal/angled shaft in one embodiment of the present invention.

Referring to FIG. 2, a side view of the protrusion 104 along with the guide 106 in one embodiment is disclosed. In one embodiment, the protrusion 104 is positioned within the guide 106 and said protrusion 104 slides within the guide and said protrusion is associated with at least one reset member 126 and said reset member is secured to a base/holder 128 using at least any one fastener. In one embodiment, when the reset member 126 decompresses and forces the protrusion 104 back to its start position, a brake/stop 124, for example, a pin which is affixed to the protrusion 104 and moves within/inside/through slits/channels 107 of the guide 106 forces the protrusion 104 to stop at a predetermined location. In one embodiment, each guide 106 associated with a protrusion 104 is configured to guide/direct the motion/positioning/re-positioning of the protrusion(s) 104 and the reset member(s) 126 and also hold the protrusion(s) 104 and reset member(s) 126 in proper location(s)/position(s).

In one embodiment, the guides 106 are made of ferrous and/or non-ferrous materials, and/or the combination thereof and they are installed to ensure the powerful forces captured by one or more protrusions is/are directed onto the item(s) it interacts with, to ensure the protrusion stays fully engaged and does not slip/pull/fall away and thus fail to transmit the overhead force into rotational force needed to rotate one or more or any or any combination of shaft, generator, gearbox, flywheel, other items. In one embodiment, each reset member 126 is located at a bottom portion of each protrusion 104 and securely positioned using a holder 128, wherein the reset member 126 is configured to quickly decompress and reposition the protrusion 104 to its original state when the object/vehicle tire passes away from the top 140 of the protrusion 104,103. In one embodiment, the holder 128 is configured to prevent the reset member 126 from flying away and/or bulging outward when the reset member 126 is compressed by the object, for example, a vehicle tire. In one embodiment, each reset member 126 is fastened to a surface.

In one embodiment, the reset member 126 is at least any one of an elastic member, spring or springs, elasticized cord or cords, pulley and counter weight system, lever and fulcrum. In another embodiment, the reset member 126 is comprised of repelling magnets. In another embodiment, the reset member 126 is a compression device and/or comprised of fluids and/or gases that compress when force is applied, and decompress when the force has passed. In an exemplary embodiment, the reset member 126 is a spring.

In one embodiment, torsion object(s) capture/hold/store energy initially transferred by passing overhead objects/vehicle tires via one or more protrusion 104, 103. The one or more torsion object(s) are directly and/or indirectly charged by the weight/force of a passing object/vehicle tire and/or energy harnessed by one or more protrusions 104, 103. In one embodiment, the one or more torsion object(s) are directly and/or indirectly charged by the same power used to rotate one or more or any or any combination of generator(s) 112, flywheel(s) 114, gearbox(es) 116, sprocket(s), bearing(s) 110. In one embodiment, the one or more torsion object(s) are united/linked/married/affixed/joined to one or more object(s)/item(s) inside the platform 122. In one embodiment, the energy held by the torsion objects(s) is then released to rotate one or more or any or any combination of generator(s) 112, flywheel(s) 114, and/or shaft(s) 108A, 108B directly or indirectly. The energy released by the torsion objects(s) is released in such a manner that the energy extends the length of rotation time and/or RPM of the generator(s) 112 and/or flywheel(s) 114 and/or shaft(s) 108A and 108B.

Figure 3:
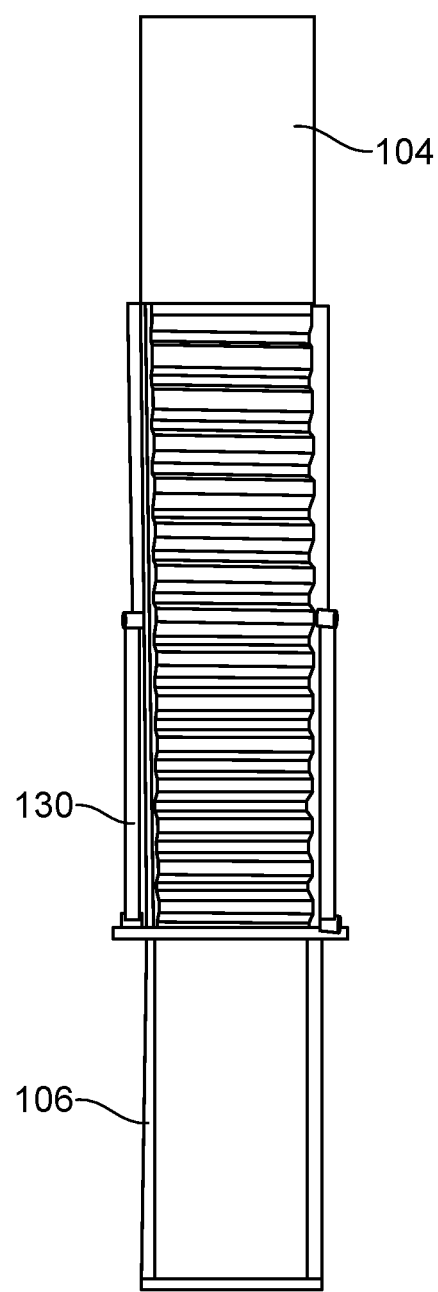
FIG. 3 shows a front view of a protrusion held within a guide (protrusion guide) of one of the electrical power generating apparatuses in another embodiment of the present invention.
Figure 4:
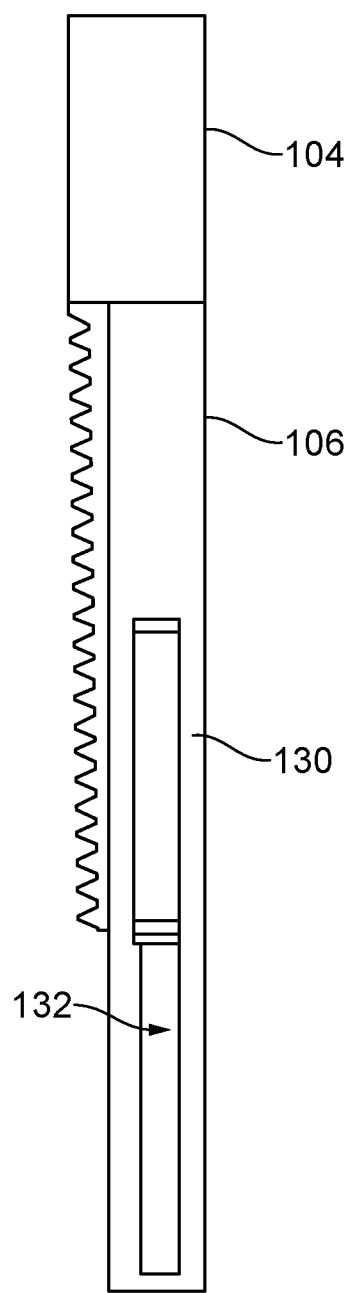
FIG. 4 shows a side view of a protrusion held within a protrusion guide of one of the electrical power generating apparatuses in another embodiment of the present invention.

Referring to FIGS. 3-4, the protrusion 104 is contained within a guide 106 in another embodiment of the present invention. In another embodiment, the protrusion 104 is positioned to slide within the guide 106 and decompress/reset after an object/vehicle tires have passed overhead via reset members 130. The protrusion 104 is configured to depress from the weight/force of an object/vehicle tire and move back upward via the reset members 130 so that the top of the protrusion 104 moves back upward through one or more apertures or holes located in/through a top portion of the protective cover 140 of the platform 122 when the object passes away from the protrusion 104. Multiple protrusions 104 could be depressed by an object or objects at the same time and/or in succession. In one embodiment, the reset members 130 are securely affixed to both left and right sides of the guide 106 and are configured to move up/down/up through the channel 132 on both sides of the guide 106 and quickly re-position/reset the protrusion 104 to its original state when the object, for example, a vehicle's tire(s), passes away from the protrusion 104. In one embodiment, the reset members 130 are affixed to the guide 106 and some portion of the protrusion 104. Each guide 106 is configured to guide/direct the motion/positioning/re-positioning of the protrusion(s) 104 and also position the protrusion(s) 104 and the reset members 130 in proper location(s)/position(s). In one embodiment, the design takes up less vertical space inside the platform 122.

Figure 5:
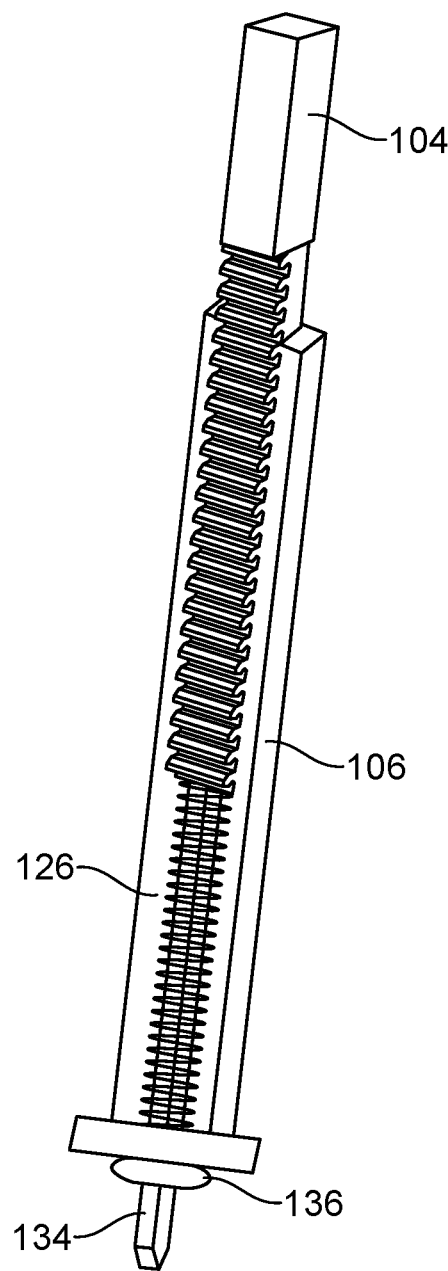
FIG. 5 shows a three quarter's front perspective view of a protrusion as a vertical shaft that can slide up and down within/through a secured protrusion guide and incorporates a reset member in yet another embodiment of the present invention.

Referring to FIG. 5, the protrusion 104 slides within the secured guide 106 and it is reset to its starting position using the reset member 126. In this embodiment, a vertical shaft 134 runs through the reset member 126, for example, a spring. The vertical shaft 134 prevents the reset member 126 from bending/bulging outward while still allowing the reset member 126 to compress freely. In one embodiment, the bottom of the vertical shaft 134 is secured to a brake/stop 136 such as, but not limited to, a locking pin, stopper or brake, and thereof. The outer diameter of the vertical shaft 134 basically fills the inner diameter of the reset member 126, for example, a spring.

Figure 6:
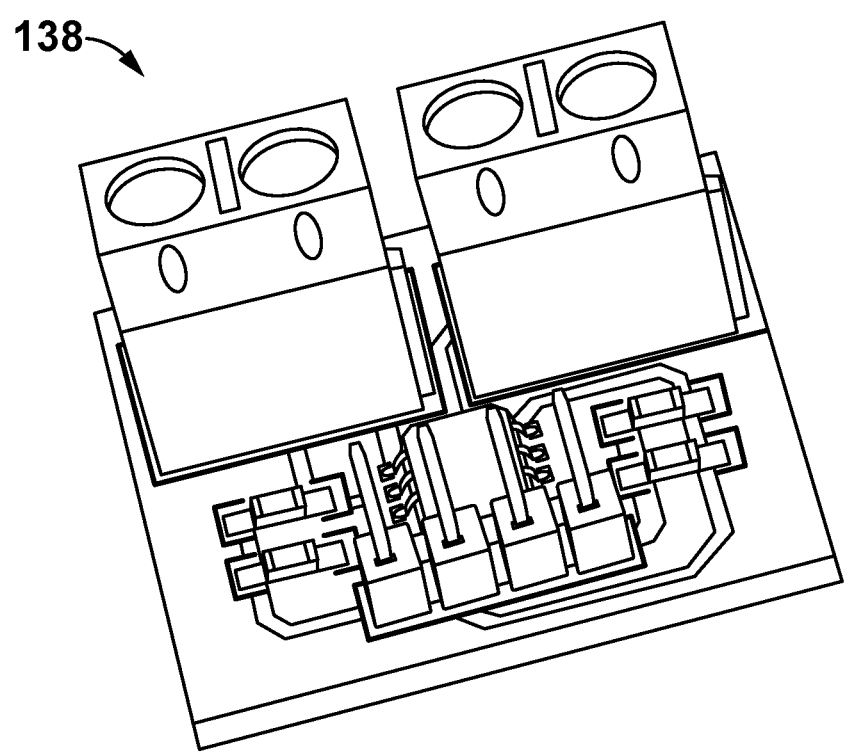
FIG. 6 show a perspective view of a sensor used for detecting/reading/registering current (amps), voltage (volts), other electrical data, other performance input(s)/data from the one or more or any or any combination of generator(s), flywheel(s), platform components/contents in one embodiment of the present invention.

Referring to FIG. 6, a sensor 138 used for detecting/reading/registering current (amps), voltage (volts), other electrical data, other performance input(s)/data from the one or more or any or any combination of generator(s), flywheel(s), platform components/contents is disclosed. In one embodiment, each platform 122 comprises one or more sensor(s) 138, meter(s), gauge(s) and any combination for detecting/reading/registering current (amps), voltage (volts), other electrical data, other performance input(s)/data from the one or more or any or any combination of generator(s), flywheel(s), platform components/contents. In one embodiment, the input from said one or more or any or any combination of, but not limited to, sensor(s) 138, meter(s), gauge(s)s are accessed locally. In another embodiment, the input from said one or more or any or any combination of, but not limited to, sensor(s) 138, meter(s), gauge(s)s are reported/accessed remotely. In another embodiment, the input from said one or more or any or any combination of, but not limited to, sensor(s) 138, meter(s), gauge(s)s can be accessed locally and/or remotely, additionally the data could be communicated via wireless or wired transmission, or both.

Figure 7:
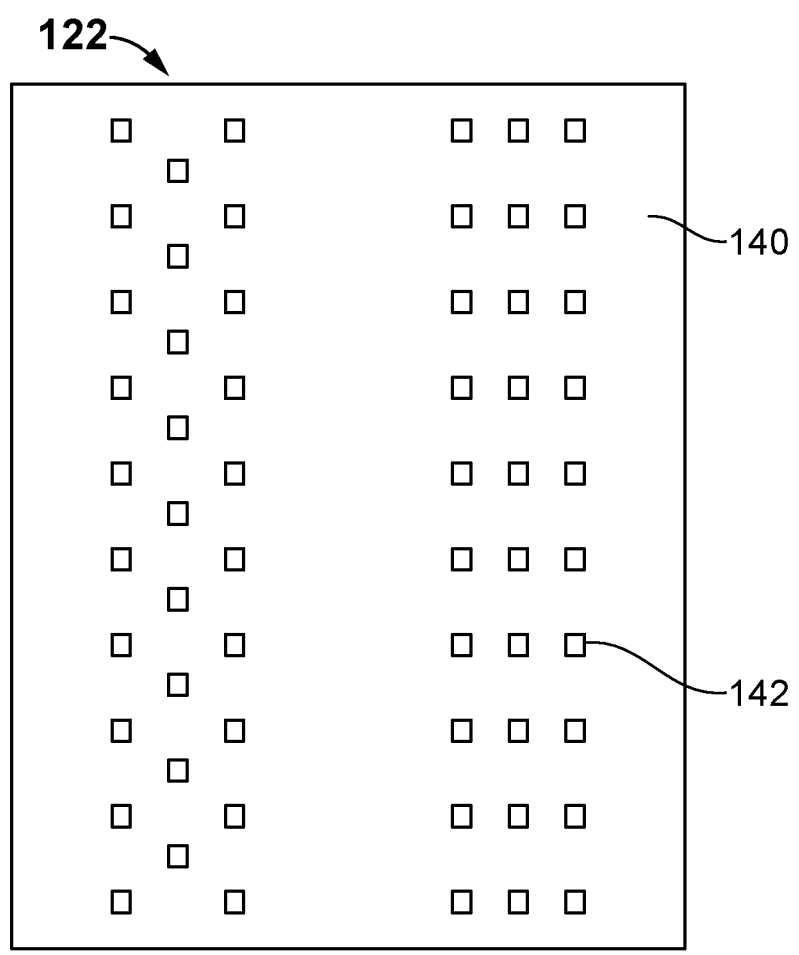
FIG. 7 shows an overhead view of a platform of an electric power generating apparatus with apertures in the top cover of the platform, in one embodiment of the present invention.

Referring to FIG. 7, an overhead view of a top portion of a platform protective cover 140 of the platform 122 is disclosed. In one embodiment, the platform 122 is to be securely positioned to lay on top of a surface and/or be affixed to surface, wherever moving objects, vehicles or vehicle attachments could travel/traverse/move/stop. In one embodiment, the surface includes, but is not limited to, one or more locations where wheeled vehicles traverse, including but not limited to entrance and exit areas of parking areas/lots, drive-throughs, streets, roads, avenues, paths, highways, expressways, freeways, thruways, bridges, tunnels, toll areas, interstates, superhighways, turnpikes, arteries, parkways, on-ramps, off-ramps, tunnels, bridges, and so forth. In another embodiment the surfaces include tracks, sidewalks, walkways, paths, trails, and floor. In one embodiment, the platforms 122 could be physically connected to each other to facilitate the smooth transfer of objects and/or wheeled vehicles along the tops of the platforms. In one embodiment, the platform protective cover 140 is comprised of a non-slip surface or surfaces on an upper exterior section to assist object(s), for example, vehicles 156 (shown in FIG. 13) for traversing/traveling/moving on the top 140 of the platforms 122. The top of the protective cover 140 of the platform 122 contains a plurality of apertures 142 and the protrusions 104 could move within/through these apertures 142. The protrusions 104 are initially raised up above the top of the platform 122. In one embodiment, the platform 122 are further comprised of a color/colors that reflects wavelengths of sunlight, in order to reflect heat away from the platform 122 and the inside of the platform 122. This could be an important cooling solution in areas with abundant sunshine. In one embodiment, the color or coatings or materials used for the top 140 of the platforms 122, or other exterior sections of the platform 122, could either absorb, or reflect, wavelengths of sunlight, or both, in order to heat or cool the platform 122. In one embodiment, the platform 122 further comprises ventilation apertures to allow air to flow into and/or outside of the platform 122. In one embodiment, the platform 122 is/are insulated. In one embodiment, the platforms 122 could be of virtually any length, width, shape or size.

In one embodiment, the electrical contents/components of the platforms 122 could be securely and electrically connected to each other using one or more conductors. In one embodiment, an insulated and/or waterproofed electrical conductor or conductors is/are used to connect the electrical components/contents, for example, generators 112 of the individual platform 122 with the electrical power grid and/or power storage unit(s), and/or to connect the components/contents of the platform(s) 122 with the electrical power grid, and/or connect the power grid or other power sources to components, for example, electrical conductors 154 (shown in FIG. 11) of the platform 122. In one embodiment, one or more insulated electrical conductor(s) enclosed inside insulated and/or water proof materials/conduits will be used to supply or transport electricity to the power grid or power storage unit(s). In one embodiment, the electric current generated by one platform 122 which houses the generators 112 is combined via insulated and/or waterproofed electrical conductor(s) with the electric current generated by one or more additional platforms 122 housing the generators 112 to transfer the generated electrical current to a power grid or other electric storage devices. In one embodiment, when electric current generated by one platform 122 exits the platform 122 and adequate conductor(s) are used to transport the electric current to the power grid or power storage unit(s), at least one diode is installed before and/or after exiting the platform 122, that allows the current to flow into the adequate transportation conductor(s), while resisting/preventing the current from flowing back into the platform 122. In one embodiment, the entire platform 122 has a height above the surface of about, but not limited to, approximately 8 inches. In one embodiment, the plurality of apertures or conduits 142 are provided on/through the top portion/cover 140 of each platform 122. In one embodiment, each aperture/conduit 142 of each platform 122 prevents rain and/or snow from entering into the platform 122 and damaging the components inside the platform 122. In one embodiment, each platform 122 is electrically grounded and/or uses ground fault circuit interrupter(s) to protect the electric power generating apparatus and people from harm while operating safely. In one embodiment, the platforms 122 and/or at least some parts/materials of the platforms 122 are made of, but not limited to, rustproof materials, and/or are coated/sealed/protected with paint(s)/chemical(s)/material(s) to shield/protect the platform 122 and/or said parts/materials from rusting, corrosion, and/or environmental wear and tear. In a preferred embodiment, the protrusions 104 could fit closely/snugly inside/within the area of the apertures 142 and fill the area of the apertures 142 so that very little moisture, or any moisture, or other environmental elements can seep inside the platform 122 through the apertures 142. In one embodiment, one or more apertures 142 enter and exit the top of the protective cover 140 of the platform 122, while one or more apertures 142 are partial apertures.

Figure 8A:
FIG. 8A shows a side view of the platform of the electric power generating apparatus which includes sloped/inclined/declined surfaces around the exterior outside portions in one embodiment of the present invention.
Figure 8B:
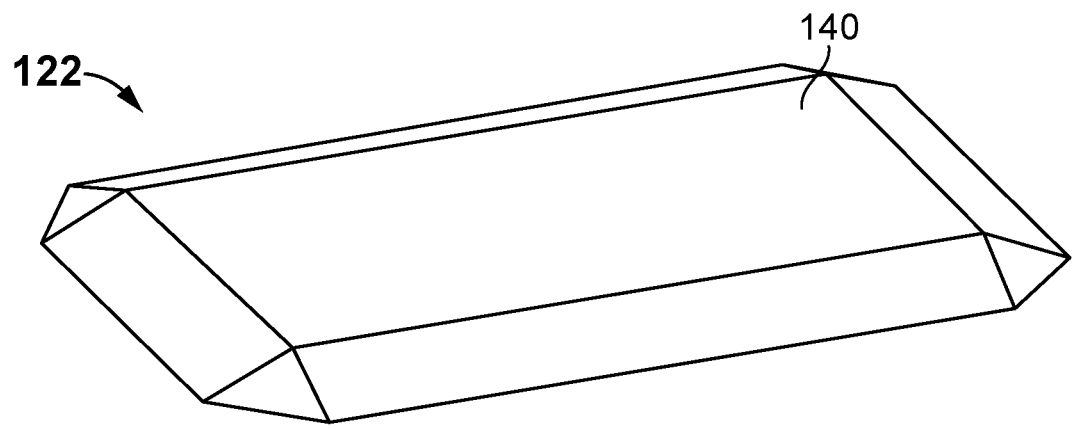
FIG. 8B shows a perspective view of the platform of the electric power generating apparatus which includes sloped/inclined/declined surfaces around the outside portions in one embodiment of the present invention.

Referring to FIGS. 8A-8B, the platform 122 includes sloped/inclined/declined surfaces around the exterior outside/side portions is disclosed. In one embodiment, the sloped/inclined/declined surfaces could be located around any exterior outside/side portions enabling smooth traveling of the vehicles 156 (shown in FIG. 13) on and off the platforms 122. In one embodiment, the inclined/sloped/declined surfaces bridge the top portion of the platform cover 140 of the platforms 122 with the surface on which they are placed. In another embodiment, if the platforms 122 are positioned in very close proximity to other platforms 122, then those sides of the platforms 122 do not require sloped/inclined/declined surfaces around the exterior side portions and neither do they require additional connector surfaces. In some embodiments, the top of at least more than one platform 122 are connected by connectors to facilitate the smooth transition of objects from the top of one platform to the next. In some embodiments, the platforms 122 do not have any sloped/inclined/declined surfaces around the exterior outside portions. In some embodiments, only a specific exterior outside/side portion, or portions of the platforms 122 have inclined/sloping/declined surfaces. In one embodiment, the platforms 122 include one or more cavities/open areas. The cavity or cavities is/are configured to receive one or more or any or any combination of protrusion 104, lever 105 (shown in FIG. 15A), gearbox 116, generators 112, flywheels 114 shafts (108A and 108B), gears 120, bearings 110, pulley(s), roller(s), sprocket(s), one-way bearing, sprag clutch bearing, freewheel clutch bearing, ratchet system 118, and so forth. In one embodiment, the platforms 122 are made of durable materials to safely support the weight of passing or stopped objects or vehicles 156 without breaking. The platforms 122 should be capable of even supporting the weight of rush hour traffic that is stopped or passing over the platforms 122, without breaking. In one embodiment, the platforms 122 can be locked with one or more locks to prevent unauthorized entry into the inside of the platforms 122. In one embodiment platforms 122 can be locked in position with one or more locks to prevent the theft of the platforms 122.

Figure 9:
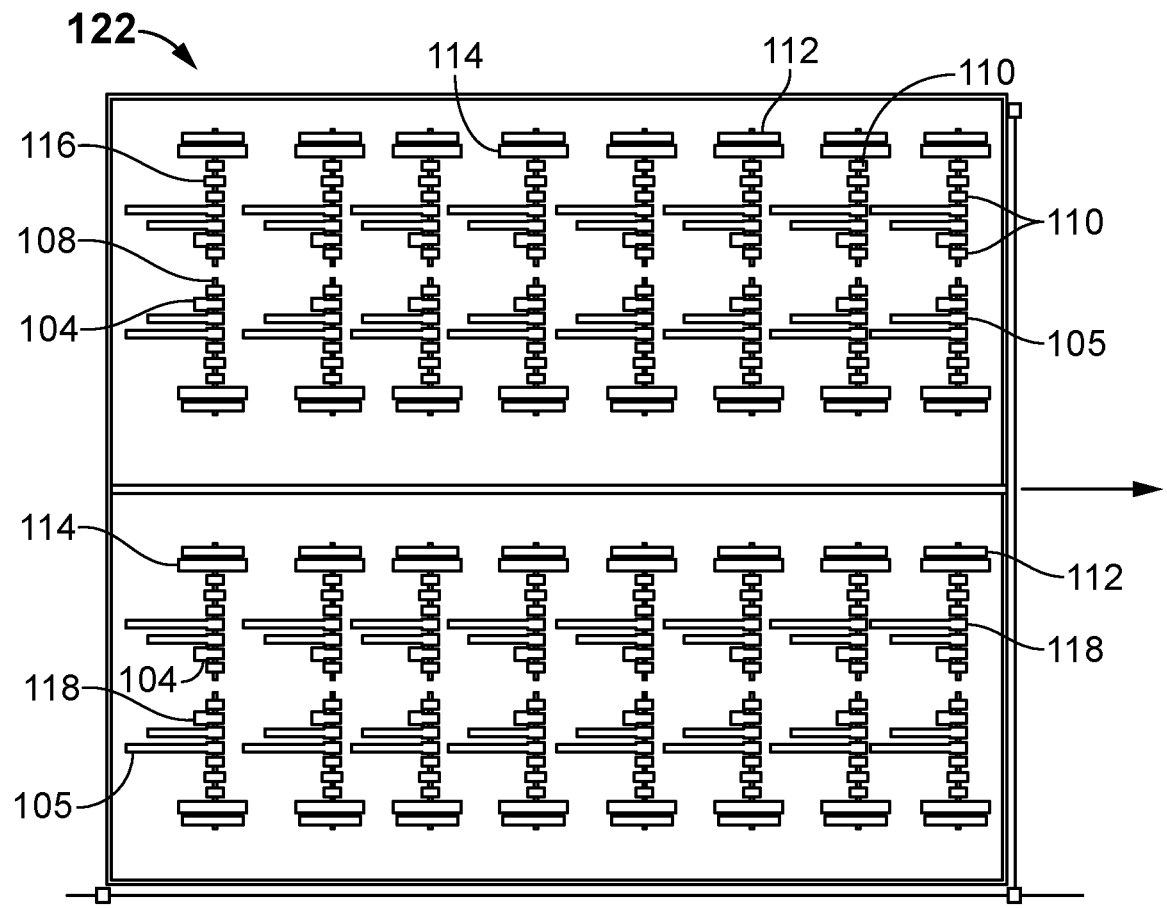
FIG. 9 shows an inside overhead cutaway view of the inside of a platform with its cavities/open areas and with one or more generators, flywheels, gearboxes, rotating shafts and push force to rotation force systems, other items, in one embodiment of the present invention.

Referring to FIG. 9, the plurality of generators 112 are securely positioned inside the cavity or cavities of the platform 122. In one embodiment, the generators 112 are electrically connected to each other to form a closed circuit or circuits. In another embodiment, the generators 112 are not connected to each other. In one embodiment, the generators 112 are securely connected to the shafts (108A and 108B) (shown in FIG. 1) that rotate one or more generators 112. In another embodiment, individual generators 112 are rotated with or without rotation of the shafts (108A and 108B). In one embodiment, one or more fan blades are affixed to a shaft or shafts (108A and 108B) and/or other components inside the platform 122 to circulate air inside the platform 112. The generators 112 are configured to generate electrical power by converting the rotational motion of the shafts (108A and 108B) and/or by being rotated directly. In one embodiment, the generators 112 are arranged in any one of, or combination of, row or column configuration in the platform 122 to maximize the holding capacity of the platform 122. In one embodiment, the platforms 122 comprise one level of generators 112, which are securely positioned inside the platforms 122. In another embodiment, the platforms 122 comprise multiple-levels/layers of generators 112, which are securely positioned inside the platforms 122. In a preferred embodiment, the generators 112 are arranged within the platform 122 in the row and/or column configuration. In one embodiment, the generators 112 are fastened or adhered to a portion of a platform or platforms 122 to keep them stable inside the platforms 122. In a preferred embodiment, the generators 112 are raised up off the floor inside the platform 122. In one embodiment, the generators 112 are placed on the floor of the platform 122. In one embodiment, the cavity or cavities of the platform 122 are separated by inner pillars or walls and/or other object(s). In one embodiment, the interior side of the platform's exterior walls are covered with water proof material(s) to keep moisture out of the inside of the platforms 122. In one embodiment, the exterior side of the platform's exterior walls are covered with water proof material(s) to keep moisture out of the inside of the platform(s) 122. In another embodiment, a combination of both the interior and exterior side(s) of the platform's exterior walls are covered with water proof material(s) to keep moisture out of the inside of the platform(s) 122. In one embodiment, specific areas inside the platform 122 are covered with water proof material(s) to keep moisture away from contents. In a preferred embodiment, the conductors that transfer the current from inside the platform 122 to outside the platform 122, exit the platform 122 in one general area to limit entry points for exterior water/moisture and/or other environmental elements into the platform 122. In one embodiment, additional covers and/or barriers are installed inside and/or outside the platform(s) 122 to keep moisture and other environmental threats off and/or away from components inside the platform(s) 122.

In a preferred embodiment, the generators 112 are configured to generate alternating current (AC). In another embodiment, the generators 112 of the apparatus 100 is/are instead configured to generate direct current (DC). Further, the DC current generated by the apparatus 100 could be converted into AC current using one or more power inverters before transferring or feeding the electric current to an electric power distributing network, for example, the power grid. In another embodiment, the apparatus 100 is further configured to generate AC current at one or more particular frequency or frequencies and magnitude from the generators 112. Further, the generated AC current at some initial frequency and/or frequencies and/or magnitude or magnitude(s) is converted to AC current with another frequency and/or another magnitude using a converter or converters.

Figure 10:
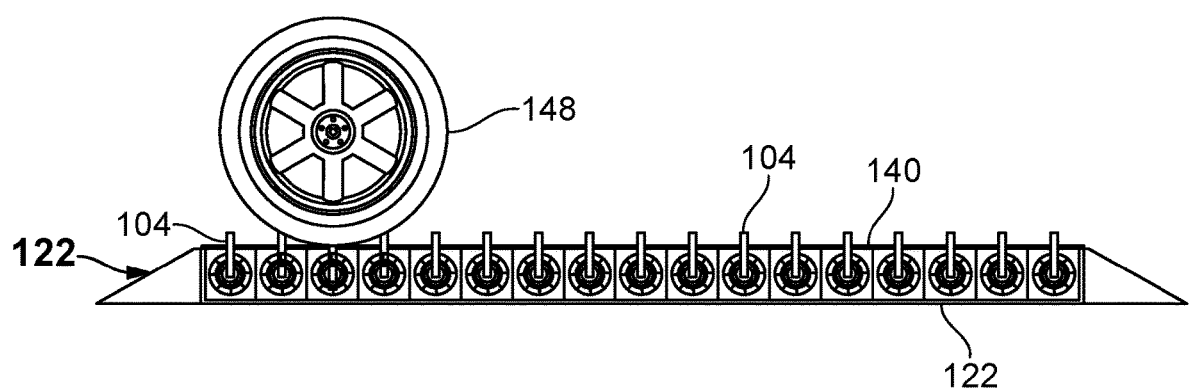
FIG. 10 shows a side cutaway view of a vehicle's tire as it passes or rolls over and/or onto the plurality of protrusions and depresses/moves them through apertures into the platform of the electric power generating apparatus in one embodiment of the present invention.

Referring to FIG. 10, a side cutaway view of a vehicle's tire 148 as it passes or rolls over and/or onto the plurality of protrusions 104 and depresses/moves them through apertures 142 into the platform 122 of the electric power generating apparatus 100 in one embodiment is disclosed. In one embodiment, the protrusions 104 are initially extended up above the top portion of the platform cover 140, and then depressed/moved into the platform 122 via/through the plurality of apertures 142 when the vehicle's tires 148 rolls/passes over/stops over the protrusions 104 of the platform 122. The downward pressing energy of the object's and/or vehicle's tire(s) 148 activates the push force to rotation force conversion by transferring that force to rotate the shafts (108A and 108B), generators 112, gearbox 116, within the platform 122. In one embodiment, the plurality of protrusions 104 is further configured to return to its/their normal or initial position after the vehicle's tire 148 passes over the said protrusions 104. The reset members (126 and 130) (shown in FIGS. 2 and 3) are configured to force the protrusions 104 to return their initial or normal position. When another tire of any vehicle rolls overhead, the protrusion(s) 104 are depressed/moved again into the platform 122, and if the generator(s) 112 are already rotating, then the passing tire 148 will accelerate the rotation of the shafts (108A and 108B) and the generator(s) 112. Neither the movement of the protrusions 104 or the rotation of the shafts (108A and 108B) will hinder and/or the rotation of the components of the generator 112 when the primary protrusion retracts to its starting/re-set position. The protrusions 104 protruding above the platform top cover/plane 140 are of a height and width that will not impede a smooth ride of vehicles traveling over the platforms 122, and will not slow down the velocity of the vehicles 156 by anything more than negligible levels. In one embodiment, the protrusions 104 protruding above the platform covers 140 are designed so as not to be ensnared and damaged by the passing overhead objects/vehicle tire treads/vehicle tires 148 or by getting caught in a passing vehicle's tire treads. Although these platforms 122 are optimized for vehicle traffic, the fact is that the weight of passing pedestrian foot traffic could also rotate the generators 112. In one embodiment, the protrusions 104 could prove to be a tripping hazard when the platforms 122 are positioned on foot traffic path/sidewalks, or other walking/running areas. Thus, the protrusions 104 should be covered with an extra protecting cover/ramp, so that passing foot traffic still depresses/moves the protrusions 104 for rotating the shafts (108A and 108B) and generating electric power using the generators 112 of the apparatus 100. In one embodiment, the protrusions 104 are covered so that when people walk/run on the protrusions, their path is made smooth and/or even and thus prevents tripping/stumbling.

Figure 11:
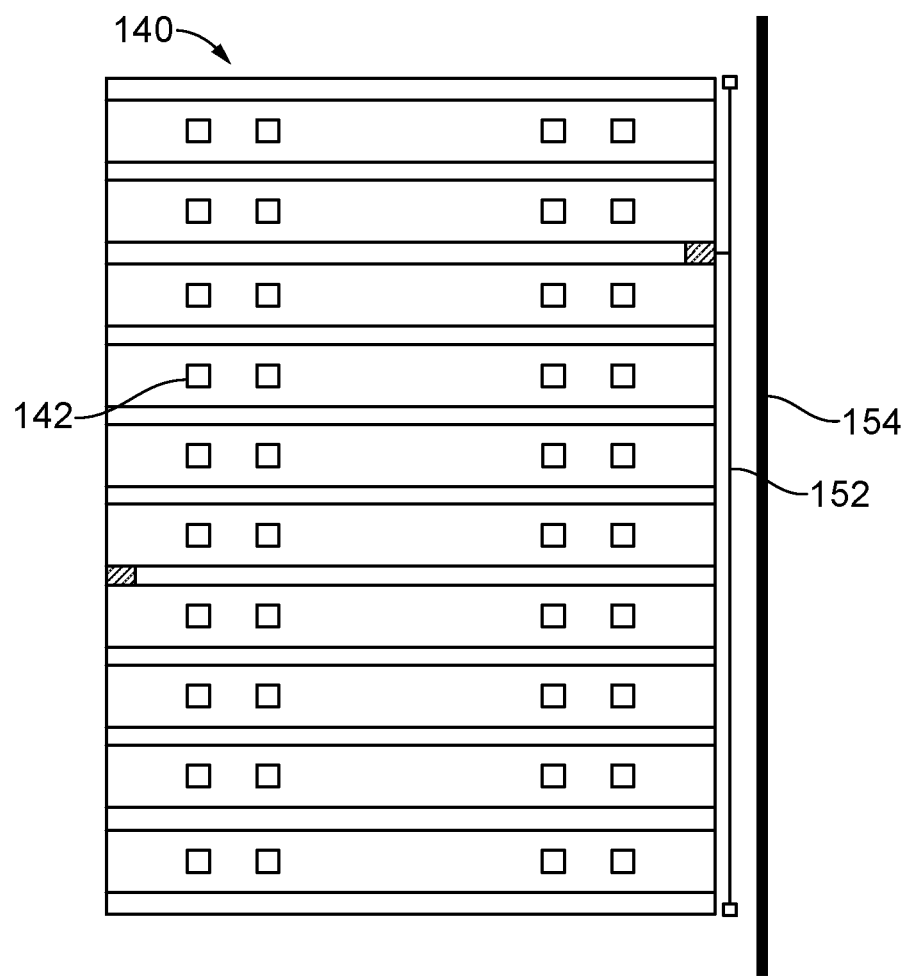
FIG. 11 shows the underside view of a protective cover of the platform including apertures in/through the protective cover, resistive conductors to melt ice/snow that would otherwise accumulate on the platforms, and electrical conductors in one embodiment of the present invention.

Referring to FIG. 11, an underside of the protective cover 140 of the platform 122 is disclosed. In one embodiment, the protective cover 140 is configured to protect the components inside the platform 122, which include, but not limited to, one or more or any protrusions 104, gearbox 116, generators 112, flywheels 114, shafts (108A and 108B), gears 120, bearings 110, pulley(s), roller(s), sprocket(s), one-way bearing, sprag clutch bearing, freewheel clutch bearing, ratchet system 118, and other components. In one embodiment, the protective cover 140 is comprised of a non-slip surface. In one embodiment, the protective cover 140 is positioned on the platform 122 and sealed to keep moisture outside of the platform 122. In one embodiment the protective cover 140 could be opened and/or closed for easy access to the platform contents. In another embodiment, the protective cover 140 is not opened and/or closed for easy access to the platform 122 and the contents. In one embodiment the protective cover 140 is removable.

In one embodiment, the underside of the protective cover 140 is provided with one or more resistive conductors 152 for melting ice and/or snow to prevent them from accumulating on the platform 122. In one embodiment, the resistive conductors 152 are affixed or integrated into, but not limited to, a top portion of the protective cover 140. In some embodiments, the resistive conductors 152 are affixed or integrated to, but not limited to, an underside of the protective cover 140. In one embodiment, the resistive conductors 152 heat up on the flow of electric current to melt the snow and/or ice that would otherwise accumulate on the top of the platform 140. In an exemplary embodiment, the resistive conductors 152 could be connected to, but are not limited to, insulated/insulated-water proof electric conductor(s) in order to provide electric current to the resistive conductors 152 of the protective cover 140. In another embodiment, the resistive conductors 152 are affixed to the top portion of the protective cover 140 and/or embedded inside the top protective cover 140. In one embodiment, one or more conductors 154 are used to transfer/transport current outside the platforms 122 to the electric power grid or the power storage unit(s).

Figure 12:
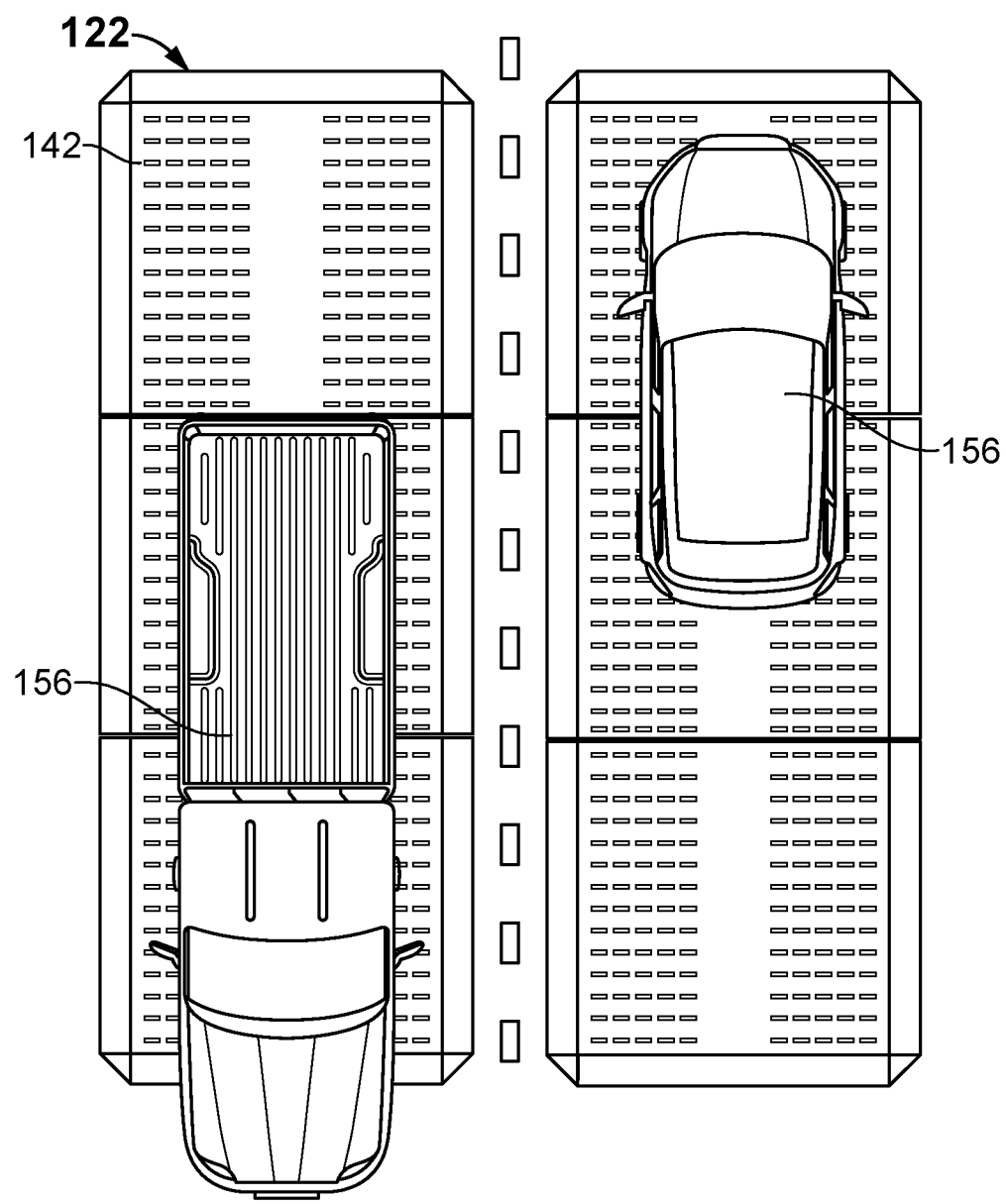
FIG. 12 shows a top view of the platforms with protrusions, and the platforms positioned on a surface, for example, a roadway in one embodiment of the present invention.

Referring to FIG. 12, the platforms 122 containing the apparatuses 100 are positioned across the surface, for example, but not limited to, roadways and highways are disclosed. In an exemplary embodiment, the platforms 122 could cover the entire width of a roadway. In one embodiment, the platforms 122 keep the roadway free from ice and snow in cold weather climates when that precipitation occurs. The resistive conductors 152 (shown in FIG. 11) melt the ice and/or snow to prevent them from accumulating on the platform 122. In another embodiment, the one or more or any or any combination of protrusions 104, gearbox 116, generators 112, flywheels 114, shafts (108A and 108B), gears 120, bearings 110, pulley(s), roller(s), sprocket(s), and one-way bearing, and/or sprag clutch bearing, and/or freewheel clutch bearing, and/or ratchet system 118 and other components of the apparatus 100 are positioned at predetermined desired or selected areas within the platforms 122. The position of one or more or any protrusions 104, gearbox 116, generators 112, flywheels 114, shafts (108A and 108B), gears 120, bearings 110, pulley(s), roller(s), sprocket(s), and one-way bearing, and/or sprag clutch bearing, and/or freewheel clutch bearing, and/or ratchet system 118 and other components of the apparatus 100 within the platform 122 could depend on where the vehicle's tires 148 (shown in FIG. 10) or where other objects are likely to pass over the top portion of the platform cover 140 of the platforms 122. In a preferred embodiment, the platform 122 does not need to have protrusions 104 (shown in FIG. 1) and/or apertures 142 situated in locations that cannot harness the force of passing vehicle's tires 148 or other object because the vehicle tires 148 or other objects will not be passing overhead in those areas. In one embodiment, a shim or shims are used to level the platform(s) 122 so that objects can move smoothly from platform to platform and/or components affixed to/inside the platform(s) 122.

Figure 13:
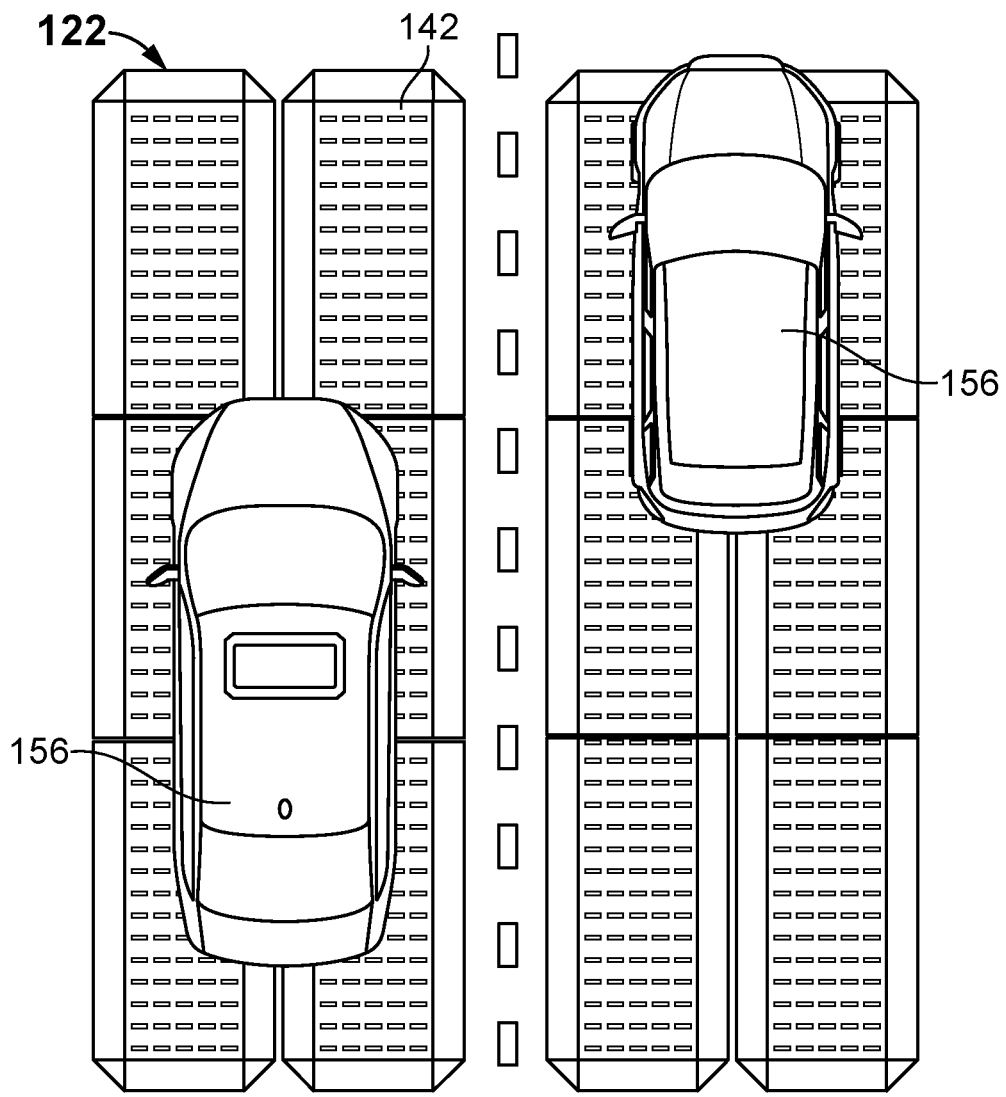
FIG. 13 shows a top view of two parallel platforms with protrusions, and the platforms are placed in a sectional configuration and positioned on a surface, for example, a roadway in another embodiment of the present invention.

Referring to FIG. 13, two parallel platforms 122 in a sectional configuration positioned to lay on top of a surface, for example, but not limited to, roadways and highways are disclosed. In an exemplary embodiment, the platforms 122 are located on the roadways in the sectional configuration and relative to where the vehicle's tires 148 are likely to pass over the top portion of the platform cover 140 of the platform 122. In one embodiment, the electric current generated by one platform 122 is electrically connected to one or more other platforms 122 via insulated and/or waterproofed electrical conductor(s) to transfer the generated electrical current to an electric distributing network, for example, the power grid. In one embodiment, the electric current generated by the generators 112 within at least one platform 122 is connected to the electric distributing network, for example, the power grid, via one or more insulated and/or waterproofed electrical conductor(s). In one embodiment, the vehicle 156 is at least an object that moves with the aid of a rotating tire or tires, such as but not limited to vehicles, cars, trucks, buses, semi-trucks, semi-trucks with trailer, tractor trailers, trailers, RVs, SUVs, campers, limousines, cabs, vans, or any other means in or by which someone travels or something is carried or conveyed or transported or any attachments to the vehicles.

Figure 14:
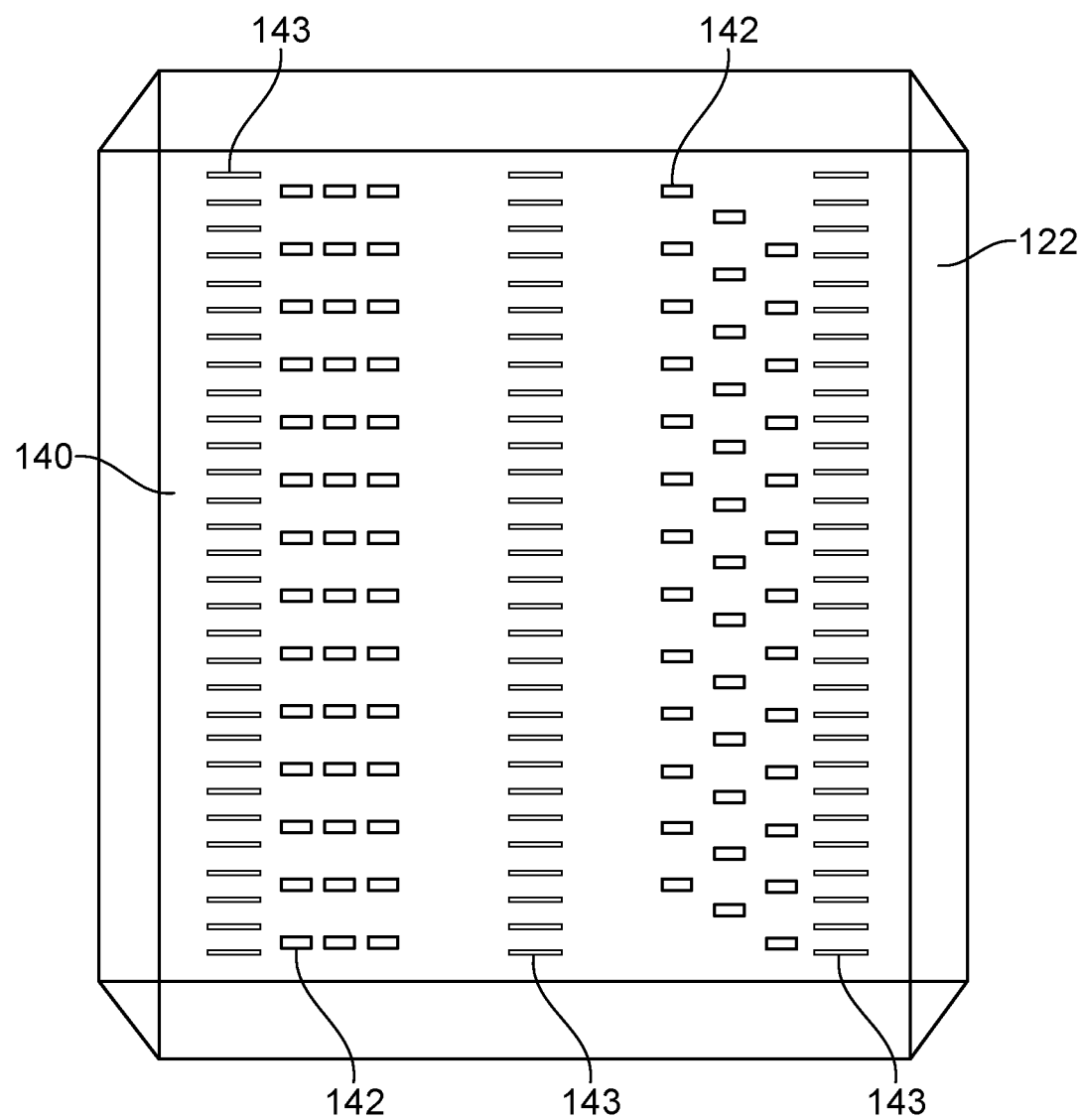
FIG. 14 shows an overhead view of a platform of an electrical power generating apparatus with apertures in the top cover of the platform and raised and/or indented strips that change the noise made by vehicle tires and thus discourage drivers from driving on them, in one embodiment of the present invention.

Referring to FIG. 14, an overhead view of a platform 122 of the electrical power generating apparatus 100 with apertures 142 in the top protective cover 140 of the platform 122 and raised and/or indented strips 143 is disclosed. In one embodiment, a series of raised and/or indented strips 143 are located on the top side exterior/outside of each platform 122. The series of raised and/or indented strips 143 will cause a change in the noise made by vehicle's tires when said tire(s) roll over the said raised and/or indented strips 143 in order to encourage and/or discourage objects/vehicles and/or drivers of said vehicles 156 (shown in FIGS. 12 and 13) from moving/traveling/driving on certain parts/sections/locations/area of the platforms 122.

Figure 15A:
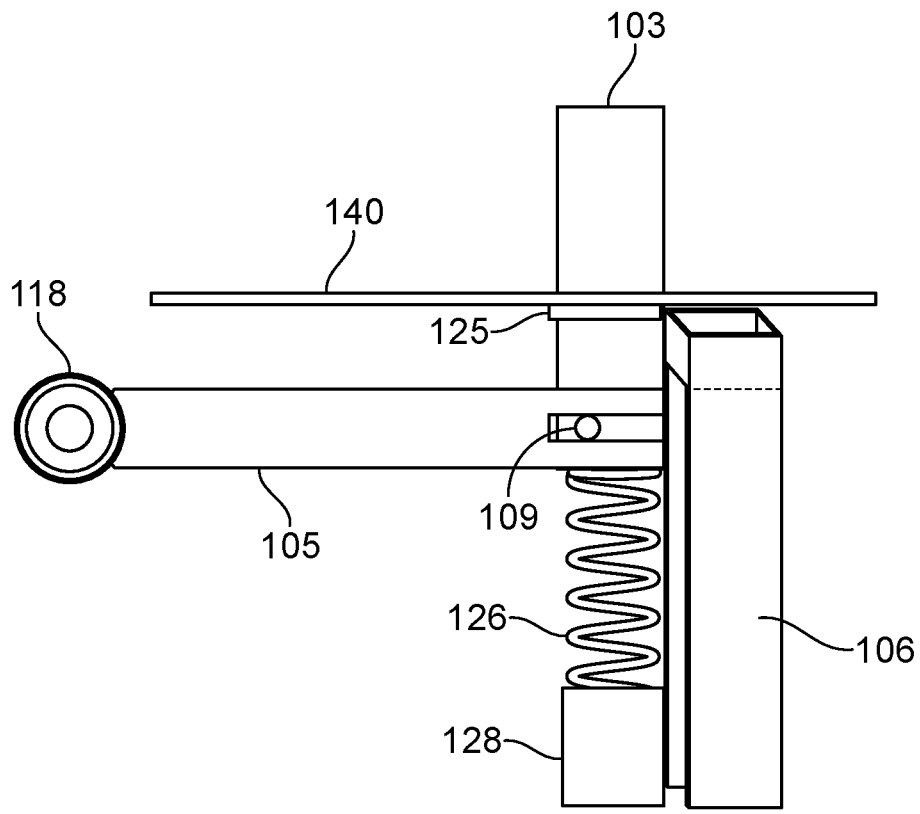
FIGS. 15A-15B shows a side view of a protrusion, lever, reset mechanism, guide, brake, ratchet/one way bearing of the electrical power generating apparatus and their interaction with a horizontal shaft (not show) in one embodiment of the present invention.
Figure 15B:
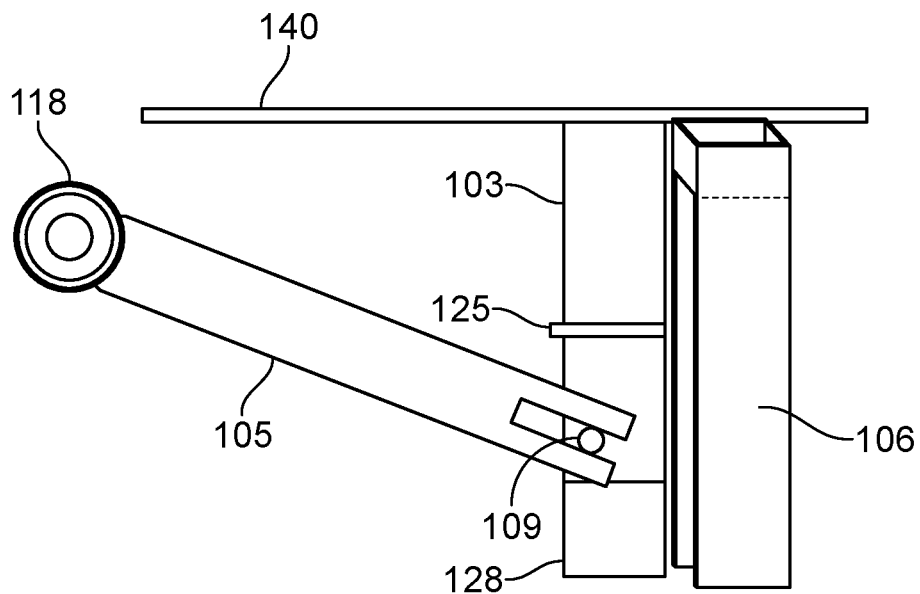

Referring to FIGS. 15A and 15B, a mechanism for converting push force to rotation force in another embodiment is disclosed. In another embodiment, the apparatus 100 further comprises one or more shorter protrusions 103, which are at least any of, but not limited to, shafts, rods, poles, strips, bars, fixtures that interact in an operative manner and/or are affixed to, and also drive/depress a lever 105. In one embodiment, the shorter protrusion 103 is affixed to the lever 105 with a pin 109 or a hinge. In one embodiment, more than one shorter protrusion 103 is configured to drive/depress the same lever 105. In one embodiment, the shorter protrusion 103 is joined to and moves in harmony with at least one or more additional shorter protrusion(s) 103. In one embodiment, the shorter protrusion 103 and lever 105 are one/combined and thus no pin 109 and/or hinge is/are needed to connect the shorter protrusion 103 and lever 105 together, and also in this embodiment the shorter protrusion 103 is angled. In one embodiment, one protrusion 103 drives/depresses more than one lever 105. In one embodiment the lever 105 is affixed to a one-way bearing/sprag clutch bearing/freewheel clutch bearing/ratchet system 118, which is in turn affixed to a horizontal shaft or other shaft, thereby rotating the shafts (108A, 108B) (shown in FIG. 1) by converting the downward and/or upward pressing force of the shorter protrusion 103 and lever 105 to the rotational motion; additionally, when the shorter protrusion 103 and lever 105 reverses and resets upward, the one way rotation of the shaft 108A is unhindered because said shaft 108A is affixed/coupled to a one-way bearing/sprag clutch bearing/freewheel clutch bearing/ratchet system 118. In one embodiment there are more than one lever 105 affixed to a horizontal or other shaft (108A, 108B) (shown in FIG. 1). In one embodiment, the levers 105 are of different lengths. In another embodiment, the levers 105 are of the same length. The horizontal or other shaft (108A, 108B) (shown in FIG. 1) is/are affixed to one or more or any or any combination of generator 112 (shown in FIG. 1), flywheel 114 (shown in FIG. 1), gearbox 116 (shown in FIG. 1), bearing 110 (shown in FIG. 1), shaft (108A 108B shown in FIG. 1). The shorter protrusion 103 and reset member 126 could move within/through the guide 106 and said guide 106 ensures the shorter protrusion 103 and reset mechanism 126 move properly in their intended route/direction. The reset member 126 is secured to a base/holder 128 using at least any one fastener. The location and position of the guide 106, and the aperture 142 of the platform 122 through which the shorter protrusion 103 passes work together to ensure that the shorter protrusion 103 moves in its proper directions/locations. In one embodiment, the section of the guide 106 directs the shorter protrusion 103 and is located around one or more parts/section(s) of any shorter protrusion 103. In one embodiment, the guide of the shorter protrusion 103 is the aperture 142 of the platform 122 and/or is incorporated into the aperture 142 of the platform 122. In one embodiment, when the shorter protrusion 103 resets upwards through the aperture 142 (shown in FIG. 14), it stops at its proper position by means of a brake/stopper 125. In another embodiment, one or more full length protrusions 104 described above have at least some teeth affixed and/or incorporated into them, and one or more levers 105, interact with the same horizontal shaft and/or shafts (108A and 108B shown in FIG. 1) to rotate one or more or any or any combination of generators 112, flywheels 114, gearbox 116, and the shafts (108A and 108B shown in FIG. 1). The levers 105 are constructed of material(s) that withstand/endure the powerful forces and torque applied to them, without breaking.

The electrical power generating apparatus 100 efficiently generates electrical power from moving objects, for example, vehicle tires with negligible incremental environment pollution. The electrical power generating apparatus 100 is installed inside platforms 122 positioned on the top of surfaces, for example, highways and roadways, and thereof.

Although some embodiments of the invention have been illustrated in the accompanying drawings and described in the above detailed description, it must be understood that the invention is not limited to the embodiments developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may and can be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An electrical power generating apparatus, comprising:
a raised platform positioned on a surface that an object traverses, the platform including a cavity configured to receive at least one protrusion, at least one shaft, and at least one generator, wherein the at least one protrusion, the at least one shaft, and the at least one generator are operably connected to each other;
the platform having an elongated top portion that includes—at least one aperture formed in the top portion, wherein the at least one protrusion is vertically-oriented relative to the top portion;
wherein the at least one protrusion is configured to move through the at least one aperture and extend above the top portion in an initial state of the at least one protrusion, and the at least one protrusion is contained within the at least one aperture in a secondary state, the at least one protrusion positioned to fill the at least one aperture relative to the top portion when in the secondary state, such that no indentation remains in the top portion when the at least one protrusion is moved from the initial state to the secondary state;
a reset member configured to move the at least one protrusion between the initial state and the secondary state;
a first subset including the at least one protrusion, the at least one shaft, and the at least one generator, and further comprising a first plurality of protrusions, a first plurality of shafts, and a first plurality of generators;
a second subset including the at least one protrusion, the at least one shaft, and the at least one generator, and further comprising a second plurality of protrusions, a second plurality of shafts, and a second plurality of generators,
wherein the at least one aperture further comprises a plurality of apertures, and each respective protrusion of the first and second plurality of protrusions is associated with a respective aperture of the plurality of apertures,
a push force to rotation force conversion system translating a push force applied to the first subset of the first plurality of protrusions to a rotational force applied to the first plurality of shafts and the first plurality of generators, and translating a push force applied to the second subset of the second plurality of protrusions to a rotational force applied to the second plurality of shafts and the second plurality of generators, wherein the push force to rotation force conversion system comprises a pivotable lever which is incorporated or affixed to at least a portion of the first plurality of protrusions and the second plurality of protrusions via a pin, and the first plurality of protrusions and the second plurality of protrusions are connected, respectively, in an operative manner to the first plurality of shafts and the second plurality of shafts via the pivotable lever and respective ratchets, thereby rotating the first plurality of shafts and the second plurality of shafts when the pivotable lever moves in an upward and downward motion,
wherein the push force to rotation force conversion system is configured to convert weight or force of the object that rotationally contacts the top portion, and when the rotational weight or force of the object moves over the top portion and the object contacts a portion of the first and/or second plurality of protrusions of the first and/or second subset, respectively, positioned in the top portion, only the portion of the first and/or second plurality of protrusions contacted moves, and the object is not moved away from the top portion of the platform by contact with the portion of the first and/or second plurality of protrusions,
wherein the first subset and the second subset are spaced apart from each other such that the first subset and the second subset are positioned in an axial alignment relative to each other and relative to an axial alignment of the elongated top portion of the platform which is positioned on the surface comprising a lane of a roadway, the at least one object moving over at least one of the first subset, the second subset, and the inactive area.

2. The apparatus of claim 1, wherein each protrusion is positioned vertically relative to the top portion in the initial state and in the secondary state.

3. The apparatus of claim 1, wherein each shaft of the first and second plurality of shafts, respectively includes at least one generator from the first and second plurality of generators, respectively.

4. The apparatus of claim 1, wherein an electric current created by the plurality of generators is at least partially transferred to an electric power grid or power storage unit(s) via one or more conductors.

5. The apparatus of claim 1, wherein the at least one object comprises a pair of tires of a vehicle, the pair of tires positioned in a transverse alignment relative to the axial alignment of the top portion of the platform as well as the axial alignment of the first and second subsets and the inactive area therebetween, such that one tire of the pair of tires contacts one portion of the first plurality of protrusions of the first subset and the other tire of the pair of tires contacts another portion of the second plurality of protrusions of the second subset simultaneously when the pair of tires are positioned to traverse over the platform providing a section of the lane of the roadway.

6. The apparatus of claim 1, wherein the top portion includes an inactive area without electrical generation therefrom, the inactive area formed without any of the first and second plurality of protrusions of the first and second subsets, respectively, and the inactive area is positioned between the first subset and the second subset, such that the first subset, the inactive area, and the second subset are positioned in an axial alignment relative to each other and relative to an axial alignment of the elongated top portion of the platform.

7. The apparatus of claim 1, wherein an exterior of the platform is colored and/or coated with a color or colors to reflect or absorb wavelengths of sunlight in order to reflect heat away from the platform and/or its contents or to absorb heat to warm the platform and/or its contents, and further comprising one or more heating items configured to heat the top surface of the platform.

8. The apparatus of claim 1, wherein at least one energy storage device is operably linked to at least one generator of the first plurality generators and the second plurality of generators, and wherein the at least one energy storage device is operably associated with at least one diode.

9. The apparatus of claim 1, further comprising an AC to DC converter operably connected to the at least one generator of at least one of the first plurality of generators and the second plurality of generators.

10. The apparatus of claim 1, further comprising a DC to AC inverter operably connected to the at least one energy storage device and to an electrical grid, to convert direct current stored by the at least one energy storage device to alternating current carried by the electrical grid.

11. An electrical power generating apparatus, comprising:
a raised platform positioned on a surface that an object traverses, the platform including a cavity configured to receive at least one protrusion, at least one rotating shaft, and at least one generator, the at least one protrusion, the at least one rotating shaft, and the at least one generator being operatively connected to each other;
the platform having an elongated top portion which includes at least one aperture formed in the top portion, wherein the at least one protrusion is vertically oriented relative to the top portion;
wherein the at least one protrusion is configured to move through the at least one aperture and extend above the top portion in an initial state of the at least one protrusion, and the at least one protrusion is contained within the at least one aperture when in a secondary state, such that the at least one protrusion is positioned to fill the at least one aperture relative to the top portion in the secondary state such that no indentation remains in the top portion when the at least one protrusion is moved from the initial state to the secondary state;
a reset member configured to move the at least one protrusion between the initial state and the secondary state;
at least one subset includes the at least one protrusion, the at least one rotating shaft, and the at least one generator, and further comprises a plurality of protrusions, a plurality of rotating shafts, and a plurality of generators,
wherein the at least one aperture comprises a plurality of apertures, and each respective protrusion of the plurality of protrusions is associated with a respective aperture of the plurality of apertures,
a push force to rotation force conversion system translating a push force applied to the plurality of protrusions of the at least one subset to a rotational force applied to the plurality of rotating shafts of the at least one subset and the plurality of generators of the at least one subset;
wherein in the at least one subset, at least one respective generator of the plurality of generators is mounted to and positioned around one respective rotating shaft of the plurality of rotating shafts, the plurality of rotating shafts causing rotation of one or more electrical generating elements of the plurality of generators,
wherein the rotation of the plurality of generators requires downward movement of a respective portion of protrusions of the plurality of protrusions through respective apertures of the plurality of apertures from the initial position to the secondary position, wherein the push force to rotation force conversion system comprises a pivotable lever which is incorporated or affixed to at least a portion of the first plurality of protrusions and the second plurality of protrusions via a pin, and the first plurality of protrusions and the second plurality of protrusions are connected, respectively, in an operative manner to the first plurality of shafts and the second plurality of shafts via the pivotable lever and respective ratchets, thereby rotating the first plurality of shafts and the second plurality of shafts when the pivotable lever moves in an upward and downward motion,
wherein the push force to rotation force conversion system is configured to convert weight or force of at least one object that rotationally contacts the top portion, and when the rotational weight or force of the at least one object moves over the top portion and contacts at least a portion of the plurality of protrusions of the at least one subset, such that only the portion of the plurality of protrusions contacted moves, and the at least one object is not moved away from the top portion of the platform by contact with the portion of the plurality of protrusions, and
wherein the top portion includes an inactive area positioned next to the at least one subset, such that the at least one subset and the inactive area are positioned side-by-side in an axial alignment relative to each other and relative to an axial alignment of the elongated top portion of the platform that is positioned on the surface comprising at least one lane of a roadway,
wherein the at least one object comprises a vehicle having at least one pair of spaced-apart tires positioned transversely relative to a chassis of the vehicle positioned therebetween, at least one tire of the at least one pair of spaced-apart tires moving over the at least one subset and the chassis positioned over at least a portion of the inactive area.

\* \* \* \* \*